(12) United States Patent
Wilkinson et al.

(10) Patent No.: US 12,390,992 B2
(45) Date of Patent: Aug. 19, 2025

(54) ADDITIVE MANUFACTURING COMPOSITIONS AND METHODS INCLUDING RESIN STABILIZED PIGMENTS

(71) Applicant: PPG Industries Ohio, Inc., Cleveland, OH (US)

(72) Inventors: Bryan W. Wilkinson, Pittsburgh, PA (US); Daniel M. Connor, Evans City, PA (US); Cynthia Kutchko, Pittsburgh, PA (US); Eric S. Epstein, Pittsburgh, PA (US); Scott J. Moravek, Mars, PA (US); Brian K. Rearick, Allison Park, PA (US); Brian Chiang, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 58 days.

(21) Appl. No.: 18/000,297

(22) PCT Filed: Apr. 5, 2021

(86) PCT No.: PCT/US2021/025714
§ 371 (c)(1),
(2) Date: Nov. 30, 2022

(87) PCT Pub. No.: WO2021/247137
PCT Pub. Date: Dec. 9, 2021

(65) Prior Publication Data
US 2023/0202103 A1  Jun. 29, 2023

Related U.S. Application Data

(60) Provisional application No. 63/035,229, filed on Jun. 5, 2020.

(51) Int. Cl.
| | | |
|---|---|---|
| *B29C 64/165* | (2017.01) | |
| *B33Y 10/00* | (2015.01) | |

(Continued)

(52) U.S. Cl.
CPC ........... *B29C 64/165* (2017.08); *B33Y 10/00* (2014.12); *B33Y 70/00* (2014.12); *B29K 2079/00* (2013.01); *B29K 2105/0032* (2013.01)

(58) Field of Classification Search
CPC ............... B29K 2105/0032; B33Y 70/00; B33Y 10/00; C08K 3/013; C09D 7/41
See application file for complete search history.

(56) References Cited

U.S. PATENT DOCUMENTS

| | | |
|---|---|---|
| 6,875,800 B2 | 4/2005 | Vanier |
| 7,438,972 B2 | 10/2008 | Kulfan |

(Continued)

FOREIGN PATENT DOCUMENTS

| | | |
|---|---|---|
| WO | 2017095658 A1 | 6/2017 |
| WO | 2019035099 A1 | 2/2019 |

(Continued)

OTHER PUBLICATIONS

International Search Report and Written Opinion received for PCT Application Serial No. PCT/US2021/025714 dated Nov. 26, 2021, 9 pages.

*Primary Examiner* — Alison L Hindenlang
*Assistant Examiner* — Debjani Roy

(57) ABSTRACT

Additive manufacturing compositions and methods may include a resin stabilized pigment. The pigment may be easily combined with at least one component of a co-reactive system, such as a co-reactive prepolymer formulation, via solid mixing without the need for grinding or additional solvents. The prepolymer formulation may be pigmented, printed, and cured under ambient conditions, and one or more pigments may be incorporated into the composition to change the color of the composition during printing and/or to selectively change the color of the printed article among several colors.

21 Claims, 4 Drawing Sheets

(51) Int. Cl.
  *B33Y 70/00*  (2020.01)
  *B29K 79/00*  (2006.01)
  *B29K 105/00*  (2006.01)

(56) References Cited

U.S. PATENT DOCUMENTS

| | | |
|---|---|---|
| 7,605,194 B2 | 10/2009 | Ferencz |
| 7,612,124 B2 | 11/2009 | Polk |
| 7,635,727 B2 | 12/2009 | Faler |
| 7,671,109 B2 | 3/2010 | Cheng |
| 7,745,514 B2 | 6/2010 | Polk |
| 7,754,786 B2 | 7/2010 | Ferencz |
| 7,910,634 B2 | 3/2011 | DeSaw |
| 7,981,505 B2 | 7/2011 | Jennings |
| 8,026,299 B2 | 9/2011 | Vanier |
| 8,129,466 B2 | 3/2012 | Polk |
| 8,178,160 B2 | 5/2012 | Ferencz |
| 8,507,050 B2 | 8/2013 | Faler |
| 8,557,895 B2 | 10/2013 | Ferencz |
| 8,575,242 B2 | 11/2013 | Bardelli |
| 8,802,752 B2 | 8/2014 | Broggi |
| 8,822,025 B2 | 9/2014 | Decker |
| 8,987,349 B2 | 3/2015 | Polk |
| 9,056,988 B2 | 6/2015 | Decker |
| 9,411,076 B2 | 8/2016 | Slezak |
| 10,253,195 B2 | 4/2019 | Fenn |
| 10,434,704 B2 | 10/2019 | Fenn |
| 2009/0182081 A1* | 7/2009 | Bardelli ............ C09C 1/24 524/592 |
| 2011/0236673 A1 | 9/2011 | Jennings |
| 2017/0355865 A1* | 12/2017 | Fenn ............ C08G 18/5024 |
| 2018/0311992 A1 | 11/2018 | Kecht et al. |
| 2020/0115574 A1* | 4/2020 | Querol Esparch ...... C08L 23/12 |
| 2021/0370588 A1* | 12/2021 | Natarajan ............ B22F 12/41 |

FOREIGN PATENT DOCUMENTS

| | | |
|---|---|---|
| WO | 2019182568 A1 | 9/2019 |
| WO | 2020167642 A1 | 8/2020 |

* cited by examiner

ADDITIVE MANUFACTURING COMPOSITIONS AND METHODS INCLUDING RESIN STABILIZED PIGMENTS

GOVERNMENT LICENSE RIGHTS

This invention was made with government support under Government Contract No. W911NF-17-2-0227 Additive Manufacturing (U.S. Army Research Laboratory, ARL). The government may have certain rights in the invention.

FIELD

The present disclosure relates to additive manufacturing compositions and methods including resin stabilized pigments, as well as methods for additive manufacturing of articles including differing color regions within the same composite article and methods of additive manufacturing wherein pigments may be selected and/or blended to achieve desired tints and colors.

BACKGROUND

Printing compositions used in three-dimensional printing are often polymers which require curing after printing, typically through heating, pressure, exposure to light, or other means, and may include pigments for tinting and coloring the articles produced. However, preparation of traditional pigments requires energy intensive methods, such as grinding, to facilitate distribution of the pigments in a carrier solvent or other carrier media, such as methods wherein the pigment first is combined with a solvent and is then ground to reduce the size of the pigment particles.

Traditional pigments are cumbersome in the context of three-dimensional printing, as the pigments are typically in the form of solutions or pastes having high amounts of solvent and which are difficult to process and incorporate into three-dimensional printing compositions. For example, a typical pigment composition may include a high solvent content as well as high amounts of other non-pigment components that are all eventually introduced into the three-dimensional printing composition along with the pigment, and which must be removed after printing such as by exposure to elevated temperatures, light, or other means and/or which may adversely affect the curing properties and/or final composition of the printed article.

What is needed is an improvement over the foregoing.

SUMMARY

The present disclosure provides a reactive additive manufacturing composition, comprising a first co-reactive component, a second co-reactive component reactive with the first co-reactive component, a pigment composition comprising resin-stabilized pigment particles, and the additive manufacturing composition including less than 5 wt. % total solvents, based on a total weight of the additive manufacturing composition.

A method for additive manufacturing comprises mixing a pigment composition comprising resin-stabilized pigment particles with a first co-reactive component, mixing the pigment composition and first co-reactive component with a second co-reactive component to form an additive manufacturing composition, the second co-reactive component reactive with the first co-reactive component, the additive manufacturing composition including less than 5 wt. % total solvents, based on a total weight of the print additive manufacturing composition; and depositing the print composition.

Another method for additive manufacturing comprises conveying a first feed composition and a second feed composition into a mixing chamber according to a first formula, the first feed composition including a first co-reactive component and one or more first pigments, and the second feed composition including a second co-reactive component reactive with the first co-reactive component, mixing the first feed composition and the second feed composition via solid mixing to form a first print composition, depositing the first print composition to form a first segment of a three-dimensional object, the first segment having a first set of properties including a first color, a first hardness, and/or a first translucency, while depositing the first print composition: conveying the first feed composition and the second feed composition into the mixing chamber according to a second formula, and mixing the first feed composition and the second feed composition via solid mixing to form a second print composition; and depositing the second print composition to form a second segment of the three-dimensional object, the second segment having a second set of properties including a second color different from the first color and/or a second hardness different from the first hardness, and/or a second translucency different from the first translucency.

A further method for additive manufacturing comprises conveying a first co-reactive component into a mixing chamber from a first co-reactive component reservoir according to a base formula; conveying a second co-reactive component into the mixing chamber from a second co-reactive component reservoir according to the base formula, the second co-reactive component being reactive with the first co-reactive component; mixing the first co-reactive component and the second co-reactive component to form a base composition; selecting one or more first pigments from a plurality of pigments based on a first target color and/or a first target translucency, the plurality of pigments contained in a plurality of pigment reservoirs connected to the mixing chamber; conveying the one or more first pigments into the mixing chamber according to a first color formula; mixing the one or more first pigments into the base composition via solid mixing to form a first print composition; and depositing the first print composition to form a first segment of a three-dimensional object, the first segment having a first set of properties including a first color and/or a first translucency.

A further method for additive manufacturing comprises conveying a first set of feed compositions into a mixing chamber according to a first formula, the first set of feed compositions being selected from a plurality of feed compositions stored in a plurality of reservoirs connected to the mixing chamber, each feed composition of the plurality of feed compositions including a first co-reactive component, a second co-reactive component reactive with the first co-reactive component, and one or more pigments, mixing the first set of feed compositions via solid mixing to form a first print composition, depositing the first print composition to form a first segment of a three-dimensional object, the first segment having a first set of properties including a first color, a first hardness, and/or a first translucency, while depositing the first print composition: conveying a second set of feed compositions into the mixing chamber according to a second formula, the second set of feed compositions being selected from the plurality of feed compositions, mixing the second set of feed compositions via solid mixing to form a second print composition, depositing the second print composition to form a second segment of the three-dimensional object, the second segment having a second set of properties including a second color different from the first color, a second hardness different from the first hardness, and/or a second translucency different from the first translucency.

DETAILED DESCRIPTION

Figure 1:
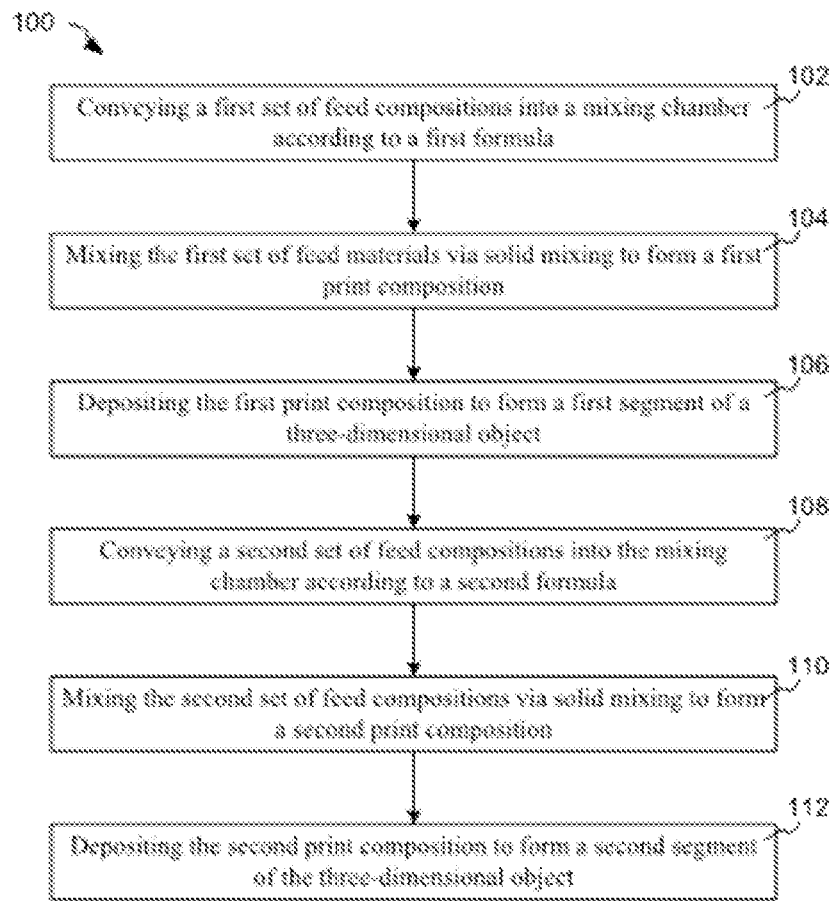
FIG. 1 is diagram showing a method for additive manufacturing a three-dimensional object.

The present disclosure provides additive manufacturing compositions and methods. The compositions may include a resin-stabilized pigment, which may be in the form of solid, resin-coated pigment particles including a pigment, a dispersant, and a dispersing resin. Alternatively, the resin-stabilized pigment may be in the form of a resin-stabilized dispersion of nanosized pigment particles. The pigment may be easily combined with at least one component of a co-reactive system, such as a co-reactive prepolymer formulation, via solid mixing without the need for grinding or additional solvents. The prepolymer formulation may be pigmented, printed, and cured under ambient conditions, and one or more pigments may be incorporated into the composition to change the color of the composition during printing and/or to selectively change the color of the printed article among several colors.

I. Definitions.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The use of the singular includes the plural and plural encompasses singular, unless specifically stated otherwise. In addition, the use of "or" means "and/or" unless specifically stated otherwise, even though "and/or" may be explicitly used in certain instances.

"Monomer" refers to compounds characterized, for example, by a molecular weight of 1000 Daltons or less, 800 Daltons or less, 600 Daltons or less, 500 Daltons or less, or 400 Daltons or less. A monomer may or may not have repeating units. A monomer may comprise two or more, such 2 to 6, reactive functional groups.

"Reactive functional group" refers to a chemical group capable of chemically reacting with another reactive functional group to form a covalent bond.

"Prepolymer" refers to a compound having repeat units in backbone. A prepolymer may include homopolymers, copolymers (including block copolymers and graft copolymers), and oligomers.

"Co-reactive composition" refers to a composition comprising at least two compounds capable of chemically reacting with each other to form covalent bonds.

"Isocyanate" refers to an $-N{=}C{=}O$ group.

"Alkenyl" refers to a $-CH{=}CH_2$ group.

"Polyalkenyl" refers to a compound having at least two alkenyl groups. The at least two alkenyl groups can be terminal alkenyl groups. Alkenyl groups can also be pendent alkenyl groups. A polyalkenyl can have two or more alkenyl groups. A polyalkenyl can comprise a single type of polyalkenyl, can be a combination of polyalkenyls having the same alkenyl functionality, or can be a combination of polyalkenyls having different alkenyl functionalities.

"Amine" refers to an $-NR_2$ group, wherein each R is independently selected from hydrogen and an organic group. An amine can comprise a primary amine group, a secondary amine group, a tertiary amine group, or a combination of any of the foregoing.

"Thiol" refers to an $-SH$ group.

"Michael donor" refers to compounds capable of reacting with activated alkenyl groups in a 1,4-addition reaction.

"Michael acceptor" refers to an activated alkene, such as an alkenyl group proximate to an electron-withdrawing group such as a ketone, nitro, halo, nitrile, carbonyl, or nitro group.

"Viscosity" is measured using an Anton Paar MCR 302 rheometer with a gap from 1 mm at 25° C. and a shear rate of 100 sec-1. "Low shear viscosity" is measured using an Anton Paar MCR 302 rheometer with a gap from 1 mm at 25° C. and a shear rate of 1 sec-1. "High shear viscosity" is measured using an Anton Paar MCR 302 rheometer with a gap from 1 mm at 25° C. and a shear rate of 100 sec-1.

"Extrusion" refers to a process used to create objects in which material is pushed through a die. An extrusion die has a shape and dimensions suitable to build an object. An extrusion die may have a fixed shape or a shape that can be changed during extrusion.

"Nanoparticles" refers to particles that have an average particle size of less than 1 micron.

II. Ambient Cured Co-Reactive Polymer Formulations.

The present disclosure provides a co-reactive system suitable for use in three-dimensional printing. The system may comprise at least two co-reactive components, which may include polymers, prepolymers and/or oligomers. The co-reactive components are reactive with one another, such that the system may be cured at ambient temperature and pressure.

A variety of chemistries may be employed in additive manufacturing of co-reactive components. A co-reactive composition refers to a composition having at least one first component that is reactive with a least one second component. In addition to the first component and the second component, the composition may include other reactive and/or non-reactive components and additives such as fillers, rheology modifiers, adhesion promoters and others. For example, as discussed below, the composition may include one or more solid state pigments. The at least one first component may comprise a first functional group and the at least one second component may comprise a second functional group, where the first functional group is reactive with the second functional group. The reaction may proceed without a catalyst.

The first component and the second component may have a single reactive functional group, but generally comprise two or more reactive functional groups such as from 2 to 20 functional groups, from 2 to 16, from 2 to 12, from 2 to 8, from 2 to 6, from 2 to 4, or from 2 to 3 reactive functional groups. The reactive functional groups may be terminal functional groups, pendant functional groups, or a combination of terminal and pendant functional groups.

The first co-reactive component may include compounds having more than one type of functional group A (see Table 1, below), and the second co-reactive component may include compounds having more than one type of functional group B (see Table I, below), such that an additive manufacturing material can comprise at least two sets of co-reactive A and B groups, wherein at least one co-reactive component has a functional group that is saturated. For example, a first co-reactive component may have compounds with hydroxyl groups and secondary amine groups (i.e., at least two different functional groups) and the second co-reactive component may have compounds with isocyanate groups. One or both of the co-reactive components may optionally comprise a catalyst for catalyzing the reaction between the A groups and the B groups.

TABLE 1

Exemplary co-reactive chemistries

| Functional Group A | Functional Group B |
|---|---|
| Carboxylic Acid | Epoxide |
| Activated unsaturated groups such as acrylate, maleic, or fumaric | Primary or Secondary Amine |
| Isocyanate | Primary or Secondary Amine |
| Isocyanate | Hydroxyl |
| Cyclic Carbonate | Primary or Secondary Amine |
| Acetoacetate | Primary or Secondary Amine |
| Epoxide | Primary or Secondary Amine |
| Thiol | Alkenyl |
| Thiol | Vinyl Ether |
| Thiol | Methacrylate |
| Activated unsaturated groups such as acrylate or maleic | Malonate |

The first component and the second component can be combined in a suitable ratio to form a curable co-reactive composition. For example, the functional Group A to functional Group B equivalent ratio of a curable composition can be as about 1.0:1.0 or greater, about 1.0:1.2 or greater, about 1.0:1.4 or greater, about 1.0:1.6 or lower, about 1.0:1.8 or lower, about 1.0:2.0 or lower, or about 1.0:1.0 or greater, about 1.2:1.0 or greater, about 1.4:1.0 or greater, about 1.6:1.0 or lower, about 1.8:1.0 or lower, about 2.0:1.0 or lower, or within any range using these endpoints.

Examples of co-reactive compositions may include polyisocyanates and polyamines which react to form polyureas. The reaction of polyisocyanates and polyamines may proceed rapidly at room temperature thereby avoiding the need to control heat flow during deposition. The polyurea reaction may also proceed rapidly in the absence of a catalyst.

A. Polyurea Compositions

The polyisocyanate component may comprise a polyisocyanate prepolymer and/or polyisocyanate monomer and the polyamine component may comprise a polyamine prepolymer and/or polyamine monomer. The polyisocyanate prepolymer and/or polyamine prepolymer can have a number average molecular weight as low as about 500 Daltons, about 1000 Daltons, about 2000 Daltons, about 5000 Daltons, about 7000 Daltons, about 10,000 Daltons, as high as about 11,000 Daltons, about 13,000 Daltons, about 15,000 Daltons, about 20,000 Daltons, or within any range including these endpoints.

The isocyanate functional component that may include polyisocyanate monomers and/or prepolymers, or a blend of polyisocyanates. For example, a polyisocyanate prepolymer can be prepared by reacting a polyol prepolymer and/or a polyamine prepolymer with a polyisocyanate such as a diisocyanate. Suitable polyisocyanate prepolymers are commercially available.

Suitable monomeric polyisocyanates may include isophorone diisocyanate (IPDI), which is 3,3,5-trimethyl-5-isocyanato-methyl-cyclohexyl isocyanate; hydrogenated diisocyanates such as cyclohexylene diisocyanate, 4,4'-methylenedicyclohexyl diisocyanate ($H_{12}$MDI); mixed aralkyl diisocyanates, such as tetramethylxylyl diisocyanates, OCN—C(—$CH_3$)$_2$—$C_6H_4$C($CH_3$)$_2$—NCO; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate, and 2-methyl-1,5-pentamethylene diisocyanate.

Suitable monomeric aromatic polyisocyanates may include phenylene diisocyanate, toluene diisocyanate (TDI), xylene diisocyanate, 1,5-naphthalene diisocyanate, chlorophenylene 2,4-dii socyanate, bitoluene diisocyanate, dianisidine diisocyanate, toluidine diisocyanate and alkylated benzene diisocyanates generally; methylene-interrupted aromatic diisocyanates such as methylenediphenyl diisocyanate, especially the 4,4'-isomer (MDI), including alkylated analogs such as 3,3'-dimethyl-4,4'-diphenylmethane diisocyanate and polymeric methylenediphenyl diisocyanate.

Suitable polyisocyanates also include polyisocyanates prepared from dimers and trimers of diisocyanate monomers. Dimers and trimers of diisocyanate monomers can be prepared, for example, by methods described in U.S. Pat. No. 5,777,061 at column 3, line 44 through column 4, line 40, which is incorporated by reference in its entirety. Dimers and trimers of diisocyanate monomers may contain linkages selected from isocyanurate, uretdione, biuret, allophanate and combinations thereof: such as Desmodur® N3600, Desmodur® CP2410, and Desmodur® N3400, available from Bayer Material Science.

A polyisocyanate may also comprise a polyisocyanate prepolymer. For example, a polyisocyanate may include an isocyanate-terminated polyether diol, an isocyanate-terminated extended polyether diol, or a combination thereof. An extended polyether diol refers to a polyether diol that has been reacted with an excess of a diisocyanate resulting in an isocyanate-terminated polyether prepolymer with increased molecular weight and urethane linkages in the backbone. Examples of polyether diols include Teratharne® polyether diols such as Terathane® 200 and Terathane® 650 available from Invista, or the PolyTHF® polyether diols available from BASF. Isocyanate-terminated polyether prepolymers can be prepared by reacting a diisocyanate and a polyether diol as described in U.S. Application Publication No. 2013/0244340, which is incorporated by reference in its entirety.

A polyisocyanate prepolymer may include an isocyanate-terminated polytetramethylene ether glycol such as polytetramethylene ether glycols produced through the polymerization of tetrahydrofuran. Examples of suitable polytetramethylene ether glycols include Polymeg® polyols (LyondellBasell), PolyTHF® polyether diols (BASF), or Terathane® polyols (Invista).

Polyisocyanate prepolymers may also include isocyanate-terminated polyetheramines. Examples of polyether amines include polyetheramines, such as Jeffamine® (Huntsman Corp.), and polyetheramines available from BASF. Examples of suitable polyetheramines may include polyoxypropylenediamine.

The amine-functional co-reactive component may include primary, secondary, or tertiary amines, or combinations thereof. Examples of suitable aliphatic polyamines include ethylamine, the isomeric propylamines, butylamines, pentyl amines, hexylamines, cyclohexylamine, ethylene diamine, 1,3-bis(aminomethyl)diamine, 1,2-diaminopropane, 1,4-diaminobutane, 1,3-diaminopentane, 1,6-diaminohexane, 2-methyl-L5-pentane diamine, 2,5-diamino-2,5-dimethylhexane, 2,2,4- and/or 2,4,4-trimethyl-1,6-diamino-hexane, 1,11-diaminoundecane, 1,12-dianiinododecane, 1,3- and/or 1,4-cyclohexane diamine,l-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

Example of suitable secondary amines may include aliphatic amines, such as a cycloaliphatic diamine. Such amines are available commercially from Huntsman Corporation (Houston, TX) under the designation of Jetfflink® such as Jefflink® 754. Other examples include Clearlink@ 1000 (Dorf-Ketal Chemicals, LLC), and aspartic ester functional amines, such as those available under the name Desmophen® such as NH1220, Desmophen® NH 1420, and Desmophen® NH 1520 (Bayer Materials Science LLC). A secondary amine can be the reaction product of isophorone diamine and acrylonitrile, such as Polyclear® 136 (available from BASF/Hansen Group LLC). A polyamine can also be provided as an amine-functional resin. For example, an amine-functional resin may comprise an ester of an organic acid, such as an aspartic ester-based amine-functional reactive resin that is compatible with isocyanates; e.g., one that is solvent-free, and/or has a mole ratio of amine-functionality to the ester of no more than 1:1 so there remains no excess primary amine upon reaction. An example of such polyaspartic esters is the derivative of diethyl maleate and1,5-diamino-2-methylpentane, available commercially from Bayer Corporation under the trade name Desmophen® NH1220. Other suitable compounds containing aspartate groups may be employed as well. Additionally, the secondary polyamines can include polyaspartic esters which can include derivatives of compounds such as maleic acid, fumaric acid esters, aliphatic polyamines and the like.

Suitable secondary amines may include acrylates and methacrylate-modified amines, including both mono- and poly-acrylate modified amines as well as acrylate or methacrylate modified mono- or poly-amines. Acrylate or methacrylate modified amines may include aliphatic amines. Secondary amines may further aliphatic amines, such as a cycloaliphatic diamine. The amine may be provided as an amine-functional resin. Such amine-functional resins may be a relatively low viscosity, amine-functional resin suitable for use in the formulation of high solids polyurea three-dimensional objects. An amine-functional resin may comprise an ester of an organic acid, for example, an aspartic ester-based amine-functional reactive resin that is compatible with isocyanates; e.g., one that is solvent-free. An example of such polyaspartic esters is the derivative of diethyl maleate and 1,5-diamino-2-methylpentane, available commercially from Bayer Corporation, PA under the trade name Desmophen™ NH1220. Other suitable compounds containing aspartate groups may be employed as well.

The polyamine may include polyoxyalkyleneamines. Polyoxyalkyleneamines contain two or more primary amino groups attached to a backbone derived, for example, from propylene oxide, ethylene oxide, or a mixture thereof. Examples of such amines include polyoxypropylenediamine and glycerol tris[poly(propylene glycol), amine-terminated] ether such as those available under the designation Jeffamine™ from Huntsman Corporation.

The amine-functional co-reactive component may also include an aliphatic secondary amine such as Clearlink® 1000, available from Dor-Ketal Chemicals, LLC. The amine-functional co-reactive component may comprise an amine-functional aspartic acid ester, a polyoxyalkylene primary amine, an aliphatic secondary amine, or a combination of any of the foregoing.

In addition to the polyisocyanates and polyamines described above, polythiols may comprise at least one of the co-reactive components. The polythiol may comprise a monomeric polythiol, a polythiol prepolymer, or a combination thereof. A polythiol may comprise a dialkenyl having a thiol functionality, or a polyalkenyl having a thiol functionality.

A polythiol may comprise any suitable thiol-terminated prepolymers or combination of thiol-terminated prepolymers. Examples of suitable thiol-terminated sulfur-containing prepolymers include thiol-terminated polythioethers, thiol-terminated polysulfides, thiol-terminated sulfur-containing polyformals, and thiol-terminated monosulfides.

B. Polythiol Compositions

A sulfur-containing prepolymer may comprise a thiol-terminated polythioether. Examples of suitable thiol-terminated polythioether prepolymers are disclosed, for example, in U.S. Pat. No. 6,172,179, which is incorporated by reference in its entirety. A thiol-terminated polythioether prepolymer can comprise Permapol® P3.1E, Permapol® P3.1E-2.8, Permapol® L56086, or a combination of any of the foregoing, each of which is available from PRC-DeSoto International Inc.

Examples of suitable dithiols may include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

Examples of suitable polythiols may include 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used. Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercaptopropionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

C. Polyalkenyl Compositions

Polyalkenyls may also comprise at least one of the co-reactive components. A polyalkenyl may comprise any suitable polyalkenyl prepolymer or combination of polyalkenyl prepolymers. A polyalkenyl prepolymer may comprise an alkenyl-terminated sulfur-containing prepolymer, which can be prepared, for example by reacting a dialkenyl compound with a thiol-terminated sulfur-containing prepolymer as described herein. A polyalkenyl may comprise a monomeric dialkenyl or combination of monomeric dialkenyls.

Examples of suitable polyalkenyls may include triallyl cyanurate (TAC), triallylisocyanurate (TAIC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyalkenyl may comprise a polyalkenyl ether or a combination of polyalkenyl ethers. Examples of suitable bis(alkenyl)ethers include divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether (TEG-DVE), tetraethylene glycol divinyl ether, and cyclohexanedimethanol divinyl ether.

D. Polyepoxide Compositions

A polyepoxide or combination of polyepoxides may comprise at least one of the co-reactive components. A polyepoxide can be monomeric, a prepolymer, or a combination thereof. Examples of suitable polyepoxides may include hydantoin diepoxide, a diglycidyl ether of bisphenol-A, a diglycidyl ether of bisphenol-F, a novolac-type polyepoxide, epoxidized unsaturated phenolic resins, dimer acid-based epoxy resins, and combinations of any of the foregoing.

E. Michael Addition Compositions

Certain co-reactive compositions provided by the present disclosure may employ Michael addition reactive components. Co-reactive compositions employing a Michael addition curing chemistry may comprise a Michael donor compound and a Michael acceptor compound.

The Michael donor compound may comprise a Michael donor monomer, a Michael donor prepolymer, or a combination thereof. Michael donors may include amines, hydroxy group containing oligomers or polymers, acetoacetates, malonates, thiols, and combinations of any of the foregoing.

The Michael acceptor compound can comprise a Michael acceptor monomer, a Michael acceptor prepolymer, or a combination thereof. A Michael acceptor group refers to an activated alkenyl group such as an alkenyl group proximate to an electron-withdrawing group such as a ketone, nitro, halo, nitrile, carbonyl, or nitro group. Examples of Michael acceptor groups include vinyl ketone, vinyl sulfone, quinone, enamine, ketimine, aldimine, oxazolidine, acrylate, acrylate esters, acrylonitrile, acrylamide, maleimide, alkylmethacrylates, vinyl phosphonates, and vinyl pyridines.

Suitable examples of catalysts for Michael addition chemistries include tributylphosphine, triisobutylphosphine, tri-tertiary-butylphosphine, trioctyl phosphine, tris(2,4,4-trimethylpentyl)phosphine, tricyclopentylphosphine, tricyclohexalphosphine, tri-n-octylphosphine, tri-n-dodecylphosphine, triphenyl phosphine, and dimethyl phenyl phosphine.

Examples of suitable Michael donors, Michael acceptors, and catalysts are shown below in Table 2.

TABLE 2

Examples of Michael donors, Michael acceptors, and catalysts

| Michael donors | Michael acceptors | Catalysts |
| --- | --- | --- |
| Acetylacetonates | Methacrylates | Strong bases such as DBU, DBN, TMG, TMP, TBD (MFC) |
| Malonates | Cyanoacrylates | Nucleophilic catalysts such as dimethylphenylphosphine |
| Nitroalkanes | Vinyl ethers | Tetrabutylammonium fluoride |
| Any other active methylene | Vinylpyridine | |
| | Any α,β-unsaturated carbonyl | |

The co-reactive components may react with one another at moderate temperatures, such as about 140° C. or less, about 100° C. or less, about 60° C. or less, about 50° C. or less, about 40° C. or less, about 30° C. or less, or about 25° C. or less. The co-reactive components may react with one another at ambient temperatures, such as 20° C. to 28° C.

Further details regarding the present co-reactive compositions and their chemistries are disclosed in PCT/IB2018/056254 (published as WO 2019/035099), assigned to the assignee of the present disclosure, which is expressly incorporated by reference herein.

III. Pigment Compositions.

Pigment compositions suitable for use in the printing compositions provided by the present disclosure may include resin-stabilized solid state pigment compositions and/or resin-stabilized dispersions of nanosized pigments. Solid state pigment compositions may comprise pigment particles stabilized with a dispersing resin to prevent agglomeration of pigment particles. Resin-stabilized dispersions of nanosized pigments may comprise nanosized pigment particles dispersed in a solvent, such as water or an organic solvent.

As used herein, "stabilized" refers to the characteristic of the pigment particles not to agglomerate. Stabilized pigment particles may be at least partially coated with a resin which serves as an interface between the pigment particle itself and its surrounding medium, thereby facilitating the stability of the particles and the avoidance of agglomeration. The coating resin may partially or fully encapsulate the pigment particles and may also facilitate dispersion of the pigment particles into the chemistry of the printing compositions.

The printing compositions, whether same include resin-stabilized solid-state pigment compositions and/or resin-stabilized dispersions of nanosized pigments, are essentially solvent free, wherein the term "solvent" as used herein is inclusive of water and any liquids including organic solvents, wherein specifically, the terms "solid-state" and "solvent free" refer to pigment compositions that include less than 5 wt. %, less than 1 wt. %, less than 0.5 wt. % or less than 0.1 wt. % total solvents, based on the overall weight of the printing composition.

Therefore, when the resin-stabilized solid-state pigment compositions and/or resin-stabilized dispersions of nanosized pigments disclosed herein are used with printing compositions, the introduction of solvents and non-pigment components are minimized, avoiding potential challenges associated with removing such components upon curing, altering cure conditions, or diluting or otherwise adversely affecting the primary chemistry of the printed article.

Pigments may be selected from iron oxides, titanium oxides, chromium oxides, chromium oxides co-precipitated with nickel and/or nickel titanates, black pigments from organic combustion (also known as carbon black), copper phthalocyanines in chlorinated and brominated forms, lead sulfochromate, lead bismuth vanadate, lead sulfochromate molybdate, arylamides, naphthols, diketo-pyrrolo-pyroles, manganese salts of azo dyes, manganese salts of beta-oxynaphthoic acid, quinacridones, and anthraquinones, for example.

The pigment particles may include an organic pigment, for example, azo compounds (monoazo, di-azo, β-naphthol, naphthol AS salt type azo pigment lakes, benzimidazolone, di-azo condensation, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing. The organic material is selected from perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, as well as substituted derivatives thereof, and mixtures thereof.

Perylene pigments may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4,9,10-tetracarboxylic acid are suitable. Crude perylenes can be prepared by methods known in the art.

Phthalocyanine pigments, especially metal phthalocyanines may be used. Although copper phthalocyanines are more readily available, other metal-containing phthalocyanine pigments, such as those based on zinc, cobalt, iron, nickel, and other such metals, may also be used. Metal-free phthalocyanines are also suitable. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Phthalocyanines may be prepared by any of several methods known in the art. They are typically prepared by a reaction of phthalic anhydride, phthalonitrile, or derivatives thereof, with a metal donor, a nitrogen donor (such as urea or the phthalonitrile itself), and an optional catalyst, such as in an organic solvent.

Quinacridone pigments, as used herein, include unsubstituted or substituted quinacridones (for example, with one or more alkyl, alkoxy, halogens such as chlorine, or other substituents typical of quinacridone pigments), and are suitable for the practice of the present invention. The quinacridone pigments may be prepared by any of several methods known in the art such as prepared by thermally ring-closing various 2,5-dianilinoterephthalic acid precursors in the presence of polyphosphoric acid.

Isoindoline pigments, which can optionally be substituted symmetrically or unsymmetrically, are also suitable for the practice of the present invention can be prepared by methods known in the art. A suitable isoindoline pigment, Pigment Yellow 139, is a symmetrical adduct of iminoisoindoline and barbituric acid precursors. Dioxazine pigments (that is, triphenedioxazines) are also suitable organic pigments and can be prepared by methods known in the art.

Mixtures of any of the previously described inorganic particles and/or organic particles can also be used in both the solid state and resin-stabilized pigment compositions.

A. Resin-Stabilized Solid State Pigment Compositions

The present disclosure provides resin-stabilized solid-state pigment compositions which are particularly useful for incorporation into additive manufacturing compositions and, in particular, for incorporation into the present co-reactive additive manufacturing compositions. The pigments include no solvent or very little amounts of solvent, require no post-process filtration, and are easily dispersed in the co-reactive compositions described above through solid mixing, such as high speed shear mixing. The pigments comprise pigment particles at least partially coated with a dispersing resin, such as an aldehyde, acrylic, or ketone resin, or combinations thereof, to prevent agglomeration of the pigment particles and facilitate dispersing of the pigment composition into the additive manufacturing compositions.

Suitable solid-state pigment compositions may include Inxel pigments, which are solid pigments commercially available from PPG Industries and Stan-Tone pigments, which are solid, flowable pastes of pigment particles stabilzed with urethane and/or polyester oligomers, commercially available from PolyOne.

The solid-state pigment compositions may comprise at least one inorganic and/or organic pigment, at least one dispersing resin, at least one dispersant or dispersing agent, and one or more additives such as solubilization accelerating agents, inorganic fillers, binding agents, rheological agents, and anti-foaming agents.

The solid-state pigment compositions may be solid-state pigments or solvent free pigments, the term "solvent" as used herein is inclusive of water and any liquids including organic solvents, wherein specifically, the terms "solid-state" and "solvent free" refer to pigment compositions that include less than 5 wt. %, less than 1 wt. %, less than 0.5 wt.

% or less than 0.1 wt. % total solvents, based on the overall weight of the pigment composition.

The pigments may be present in the solid-state pigment compositions in a solids amount, excluding volatile components such as solvents and/or water, of about 10 wt. % or greater, about 20 wt. % or greater, about 25 wt. % or greater, about 30 wt. % or greater, about 35 wt. % or greater, about 40 wt. % or greater, about 45 wt. % or greater, about 50 wt. % or lower, about 55 wt. % or lower, about 60 wt. or lower, about 65 wt. % or lower, about 70 wt. % or lower, or within any range using these endpoints, with the remainder including stabilizing resins, dispersants and/or additives.

The solid-state pigment compositions may include a dispersing resin such as an acrylic, aldehyde, and/or ketone resin. These resins may be used to coat the pigment particles. Examples of acrylic resins may include Degalan F, produced by Evonik Rohm GmbH; Joncryl® 682; Joncryl® 690; Joncryl® 678; Joncryl® HPD 671 distributed by BASF. Examples of aldehyde or ketone resins may include the products distributed by BASF as Laropal®; in particular, Laropal® A 101 and A 81, which are condensation products of urea and aliphatic aldehydes, while suitable ketone resins may be condensation products of methylcyclohexanone or cyclohexanone, such as Laropal® K 80. Laropal® LR 9008 1 s an aqueous solution of a modified aldehyde resin.

The acrylic resin may have an acidity number higher than 30 (such as higher than 50), an average molecular weight of about 1000 g/mol or greater, about 2000 g/mol or greater, about 5000 g/mol or greater, about 10,000 g/mol or greater, about 15,000 g/mol or lower, about 20,000 g/mol or lower, about 25,000 g/mol or lower, about 30,000 g/mol or lower, or within any range including these endpoints, such as from 1500 g/mol to about 20,000 g/mol. The glass transition point ("Tg") may be about 40° C. or greater, about 50° C. or greater, about 60° C. or greater, about 70° C. or greater, about 80° C. or lower, about 90° C. or lower, about 100° C. or lower, about 110° C. or lower, about 120° C. or lower, about 130° C. or lower, or within any range including these endpoints, for example from about 40° C. to about 70° C.

The acrylic, aldehyde, and/or ketone dispersing resin may be present in the solid-state pigment composition in an amount of about 0 wt. % or greater, about 5 wt. % or greater, about 10 wt. % or greater, about 15 wt. % or greater, about 20 wt. % or greater, about 25 wt. % or lower, about 30 wt. % or lower, about 35 wt. % or lower, about 40 wt. % or lower, about 45 wt. % or lower, about 50 wt. % or lower, or within any range using these endpoints.

The dispersant or dispersing agent may include those marketed by Evonik under the trademark Tego®Dispers and, in particular, Tego®Dispers 650, 651, 652, 655, 685, 755W and 760W or under the trademarks LAD 604, LAD 1275, LAD1045 and LAD1084. These products may be described as styrene and polyether copolymers, maleic acid amides, fatty acid derivatives, modified polymers having groups with high affinity for the pigments, modified polyethers having groups with high affinity for the pigments, low molecular weight polymers, alkoxylated fatty alcohols.

The dispersing agent may further include those marketed by BYK under the trademarks BYK 9076 and 9077 or under the trademark Disperbyk® and, in particular, Disperbyk®180, 190, 191, 192 and 194. These products may be described as alkyl ammonium salts and, in particular, alkyl ammonium salts of block copolymers with acid groups.

Other dispersing agents may include polyurethane oligomers such as those marketed by OMG Borchers under the trademarks Borchigen® 0451, 0754 and 0755, those marketed by Munzing Chemie under the trademark Meteolat® 392, those marketed by Ciba under the trademark EFKA® 4000, 5000 and 6745, those marketed by Urai under the trademark Nuosperse®, and those marketed by Uniqema under the trademark Atmer®, in particular, Atmer 116®; which are sorbitan esters and epoxidized soybean oils. Other dispersing agents may include polyester oligomers and polyester polyurethane oligomers.

The dispersant or dispersing agent may be present in the solid-state pigment composition in an amount of about 1 wt. % or greater, about 2 wt. % or greater, about 3 wt. % or greater, about 4 wt. % or greater, about 5 wt. % or lower, about 6 wt. % or lower, about 7 wt. % or lower, about 8 wt. % or lower, about 9 wt. % or lower, about 10 wt. % or lower, or within any range using these endpoints.

Solubilization accelerating agents may include alkaline metal and alkaline-earth carbonates and bicarbonates, such as sodium carbonate; polyvinylpyrrolidone (PVP); polyvinyl alcohols; water-soluble polyethers; ethylene glycols; water-soluble acrylates; alcohol ethoxylates; linear alkylbenzene sulfonates, alkyl sulfonates and alcohol ether sulfates; betaine; and citric acid.

The solubilizing accelerating agent may be present in the solid-state pigment composition in an amount of about 5 wt. % or greater, about 10 wt. % or greater, about 15 wt. % or greater, about 20 wt. % or greater, about 25 wt. % or lower, about 30 wt. % or lower, about 35 wt. % or lower, about 40 wt. % or lower, or within any range using these endpoints.

The inorganic filler may be present in the solid-state pigment composition in an amount of about 5 wt. % or greater, about 10 wt. % or greater, about 15 wt. % or greater, about 20 wt. % or lower, about 25 wt. % or lower, about 30 wt. % or lower, or within any range using these endpoints.

The binding agents may include modified ketone polyethers with groups having an affinity with the pigments, solid bonding resins, and lignin sulfonate.

The binding agent may be present in the solid-state pigment composition in an amount of about 0.5 wt. % or greater, about 1 wt. % or greater, about 2 wt. % or greater, about 3 wt. % or lower, about 4 wt. % or lower, about 5 wt. % or lower, or within any range using these endpoints.

The rheological agents may be selected from bentonite, ethers of cellulose, esters of cellulose, and esters of carboxymethyl cellulose.

The rheological agent may be present in the solid-state pigment composition in an amount of about 2 wt. % or greater, about 5 wt. % or greater, about 7 wt. % or greater, about 10 wt. % or greater, about 12 wt. % or lower, about 15 wt. % or lower, about 17 wt. % or lower, about 20 wt. % or lower, or within any range using these endpoints.

The anti-foaming agent may be a polyether siloxane copolymer.

The anti-foaming agent may be present in the solid-state pigment composition in an amount of about 2 wt. % or greater, about 3 wt. % or greater, about 4 wt. % or lower, about 5 wt. % or lower, or within any range using these endpoints.

The additives, such as solubilization accelerating agents, inorganic fillers, binding agents, rheological agents, and anti-foaming agents, may be present in the solid-state pigment composition in a total amount of about 35 wt. % or lower, about 25 wt. % or lower, about 20 wt. % or lower, about 10 wt. % or lower, about 5 wt. % or lower, about 1% or lower, or about 0 wt. %.

The solid-state pigment composition may be in the form of tablets, granules or powders and, for purposes of incorporation into the present additive manufacturing compositions, will typically be in the form of a powder, i.e., powder particles. The powder particles may have an average particle size of about 0.5 micrometers or greater, about 1 micrometer or greater, about 2 micrometers or greater, about 5 micrometers or greater, about 10 micrometers or greater, about 50 micrometers or greater, about 100 micrometers or greater, about 150 micrometers or lower, about 200 micrometers or lower, about 300 micrometers or lower, about 400 micrometers or lower, or within any range using these endpoints.

Average particle size can be measured according to known laser scattering techniques. For example, average particle size can be determined using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle. Average particle size can also be determined by visually examining an electron micrograph of a transmission electron microscopy ("TEM") image of a representative sample of the particles, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle.

The solid-state pigment compositions may be prepared by simple mixing and simultaneous grinding of the components, followed by extrusion of the components using a co-rotating twin screw extruder. The mixture by then be cooled in a drum cooler, and, optionally, compressed.

The mixing/grinding of the components may be performed using mixers or turbo-mixers, such as in the dry state (without the presence of organic solvents or water). The mixing speed may be 500 rpm or greater, 600 rpm or greater, 800 rpm or greater, 900 rpm or lower, 1000 rpm or lower, 1200 rpm or lower, 1500 rpm or lower, or within any range using these endpoints.

If necessary, an intermediate extrusion stage may be introduced, such that the sequence comprises mixing/grinding, extrusion, mixing/grinding, and optional compression. The optional intermediate extrusion stage may be performed in the dry state, without any additional organic solvents or water.

The resultant solid-state pigment compositions may be added directly to at least one of the components of the co-reactive polymer formulation described above and dispersed using solids mixing methods, such as high speed shear mixing.

B. Resin-Stabilized Dispersions of Nanosized Pigments

The present disclosure also provides resin-stabilized dispersions of nanosized pigments suitable for use in three-dimensional printing compositions. Nanosized pigment particles are particularly attractive as pigment sources due to the size of the particles, wherein smaller particle sizes result in less light scattering, resulting in good color transparency with low haze.

However, nanosized particles generally have high surface energy, meaning that the intermolecular forces between particles are strong. Therefore, nanosized particles tend to agglomerate rather than disperse in a solvent. In the context of pigments, agglomeration of nanosized pigment particles may lead to precipitation of the pigment particles from the solvent.

To overcome this problem, a polymeric dispersant may be used. The polymeric dispersant may be designed such that a portion of the polymer has a high affinity for the pigment particles while another portion of the polymer has a high affinity for the solvent. The polymer interacts with the pigment particles, thereby introducing steric hindrance between pigment particles, lowering intermolecular interactions between the pigment particles, and preventing agglomeration, resulting in a stable, dispersible pigment formulation.

Suitable polymeric dispersants may include both inorganic and organic polymers, such as those described in U.S. Pat. No. 8,557,895, assigned to the assignee of the present disclosure, which is incorporated herein by reference in its entirety. Suitable inorganic polymers may include polyphosphazenes, polysilanes, polysiloxanes, polygermanes, polymeric sulfur, polymeric selenium, silicones and mixtures of any of the foregoing. Suitable organic polymers may include thermoplastic polyesters, such as polyethylene terephthalate, polybutylene terephthalate and polyethylene naphthalate, polycarbonates, polyolefins, such as polyethylene, polypropylene and polyisobutene, acrylic polymers, such as copolymers of styrene and an acrylic acid monomer, thermoset polyesters, vinyl esters, epoxy materials, phenolics, aminoplasts, thermoset polyurethanes, and polymers containing methacrylate, polyamides, thermoplastic polyurethanes, vinyl polymers, and mixtures of any of the foregoing.

The nanosized pigment particles of the present disclosure may have an average particle size of 300 nanometers or less, 200 nanometers or less, 150 nanometers or less, or 100 nanometers or less. However, generally, to achieve the desired haze (minimal scattering) of 10% or less, the pigment particles have an average primary particle size of no more than 150 nanometers.

As used herein, "haze" refers to a measurement of the transparency of a material and is defined by ASTM D1003. The pigment particles present in the formulation may have a maximum haze of 10% or less, 5% or less, 1% or less, or 0.5% or less. such as a maximum haze of 5%, or a maximum haze of 1%, or, in yet other embodiments, a maximum haze of 0.5%.

The pigment particles may be present in the resin-stabilized dispersion in a solids amount, excluding volatile components such as solvents and/or water, of about 10 wt. % or greater, about 20 wt. % or greater, about 25 wt. % or greater, about 30 wt. % or greater, about 35 wt. % or greater, about 40 wt. % or greater, about 45 wt. % or greater, about 50 wt. % or lower, about 55 wt. % or lower, about 60 wt. or lower, about 65 wt. % or lower, about 70 wt. % or lower, or within any range using these endpoints, with the remainder including stabilizing resins, dispersants and/or additives.

The polymeric dispersant may be present in the resin-stabilized dispersion in an amount of about 25 wt. % or greater, about 30 wt. % or greater, about 35 wt. % or less, about 40 wt. % or less, or within any range using these endpoints.

The total amount of solids in the resin-stabilized dispersion may be about 30 wt. % or greater, about 35 wt. % or greater, about 40 wt. % or less, about 45 wt. % or less, or within any range using these endpoints.

The resin-stabilized nanosized pigment particles may be dispersed in a solvent, such as water, or an organic solvent, such as butyl acetate. The amount of solvent in the resin-stabilized dispersion may be about 55 wt. % or greater, about 60 wt. % or greater, about 65 wt. % or greater, about 70 wt. % or less, about 75 wt. % or less, about 80 wt. % or less, about 85 wt. % or less, or within any range using these endpoints.

The small particle size, in conjunction with low light scattering and high transparency, results in high color efficiency; in other words, the resin-stabilized dispersions of nanosized pigment particles may be added in smaller amounts than conventional pigments while still delivering the desired color. Therefore, the resin-stabilized dispersions of nanosized pigment particles may be present in the three-dimensional printing formulation in very small amounts, such as 1 wt. % or less.

As a result, any residual solvent added to the printing formulation from the resin-stabilized dispersion is minimal. Specifically, the amount of solvent from the resin-stabilized dispersion present in the printing formulation is about 0.5 wt. % or less, about 0.4 wt. % or less, about 0.3 wt. % or less, about 0.2 wt. % or less, or about 0.1 wt. % or less.

IV. Additives.

The formulations of the present disclosure may further include various additives, such as rheology modifiers (e.g., silica or other fillers), flow control agents, plasticizers, thermal stabilizers, UV stabilizers, wetting agents, dispersing auxiliaries, deformers, fillers, reactive diluents, flame retardants, catalysts, pigments, solvents, adhesion promoters, and combinations of any of the foregoing.

An additive or combination of additives can be used to control and/or facilitate a three-dimensional printing operation, including mixing and extrusion. For example, an additive can control the viscosity, mixing, hydrophobicity, hydrophilicity, rheology, or a combination of any of the foregoing.

A filler may comprise, for example, an inorganic filler, an organic filler, a low-density filler, an electrically conductive filler, or a combination of any of the foregoing.

Inorganic fillers useful in compositions provided by the present disclosure may include carbon black, calcium carbonate, precipitated calcium carbonate, calcium hydroxide, hydrated alumina (aluminum hydroxide), fumed silica, silica, precipitated silica, silica gel, and combinations of any of the foregoing.

Organic fillers useful in compositions provided by the present disclosure may include thermoplastics, thermosets, or a combination thereof. Examples of suitable organic fillers include epoxies, epoxy-amides, ethylene tetrafluoroethylene copolymers, polyethylenes, polypropylenes, polyvinylidene chlorides, polyvinylfluorides, tetrafluoroethylene, polyamides, polyimides, ethylene propylenes, perfluorohydrocarbons, fluoroethylenes, polycarbonates, polyetheretherketones, polyetherketones, polyphenylene oxides, polyphenylene sulfides, polyether sulfones, thennoplastic copolyesters, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Further examples of suitable organic fillers include polyamides, such as polyamide 6 and polyamide 12, polyimides, polyethylene, polyphenylene sulfides, polyether sulfones, polysulfones, polyethylimides, polyvinyl fluorides, thermoplastic copolyesters, and combinations of any of the foregoing.

V. Properties of the Additive Manufacturing Compositions.

It will be appreciated that the viscosity, reaction rate, and other properties of the co-reactive components may be adjusted to control the flow of the co-reactive components and/or the thermosetting compositions such that the deposited portions and/or the object achieves and retains a desired structural integrity following deposition. The viscosity of the co-reactive components may be adjusted by the inclusion of a solvent, or the co-reactive components may be substantially free of a solvent or completely free of a solvent. The viscosity of the co-reactive components may be adjusted by the inclusion of a filler, or the co-reactive components may be substantially free of a filler or completely free of a filler. The viscosity of the co-reactive components may be adjusted by using components having lower or higher molecular weight. For example, a co-reactive component may comprise a prepolymer, a monomer, or a combination of a prepolymer and a monomer. Viscosity of the co-reactive components may be adjusted by changing the deposition temperature. The co-reactive components may have a viscosity and temperature profile that may be adjusted for the particular deposition method used, such as mixing prior to deposition and/or ink-jetting. The viscosity may be affected by the composition of the co-reactive components themselves and/or may be controlled by the inclusion of rheology modifiers as described herein.

It can be desirable that the viscosity and/or the reaction rate be such that following deposition of the co-reactive components the composition retains an intended shape following deposition. For example, if the viscosity is too low and/or the reaction rate is too slow a deposited composition may flow in a way the compromises the desired shape of a finished object. Similarly, if the viscosity is too high and/or the reaction rate is too fast, the desired shape may be compromised.

For example, each of the co-reactive components that are deposited together may each independently have a viscosity at 25° C. and a shear rate at 0.1 sec$^{-1}$ to 100 sec$^{-1}$ from 200 cP to 20,000,000 cP, from 1,000 cP to 18,000,000 cP, from 5,000 cP to 15,000,000 cP, from 5,000 cP to 10,000,000 cP, from 5,000 cP to 5,000,000 cP, from 5,000 cP to 1,000,000 cP, from 5,000 cP to 100,000 cP, from 5,000 cP to 50,000 cP, from 5,000 cP to 20,000 cP, from 6,000 cP to 15,000 cP, from 7,000 cP to 13,000 cP, or from 8,000 cP to 12,000 cP. Viscosity values are measured using an Anton Paar MCR 302 rheometer with a gap from 1 mm at a temperature of 25° C. and a shear rate of 100 sec$^{-1}$. A suitable viscosity can depend on several factors including the deposition system used for printing, the dimensions of the system, the deposition speed, and the cure rate of the reactive components.

The co-reactive composition form from the combination of the two or more reactive components can have a dynamic viscosity, for example, from 200 cP to 20,000,000 cP, from 1,000 cP to 18,000,000 cP, from 5,000 cP to 15,000,000 cP, from 5,000 cP to 10,000,000 cP, from 5,000 cP to 5,000,000 cP, from 5,000 cP to 1,000,000 cP, from 5,000 cP to 100,000 cP, from 5,000 cP to 50,000 cP, from 5,000 centipoise cP to 20,000 cP, from 6,000 cP to 15,000 cP, from 7,000 cP to 13,000 cP, or from 8,000 cP to 12,000 cP.

Compositions having the following properties after mixing the co-reactive components, either independently or in various combinations can be successfully printed using, for example, a two-component progressive cavity pump: initial G"/G' ratio is within a range from 1 to 5, such as greater than 2, greater than 3 or greater than 4; initial phase angle δ within a range from 45° to 89°; tan δ>45 at 7 minutes; and/or initial viscosities of the single co-reactive components differ from each other by no more than 20%. Compositions may be thixotropic in that they are shear thinning, non-Newtonian fluids that becomes less viscous when sheared. Compositions that are thixotropic may help achieve faster extrusion (e.g., high shear rate) of compositions while needing only reasonable amount of extrusion pressure corresponding to the relatively low shear stress because viscous compositions may be shear-thinned by being extruded at a faster rate, thus reducing the extrusion pressure as compared to a Newtonian fluid.

VI. Three-Dimensional Printing Methods.

FIG. 1 is a simplified diagram showing a method 100 for additive manufacturing a three-dimensional object. The method 100 includes a process 102 of conveying a first set of feed compositions into a mixing chamber according to a first formula, a process 104 of mixing the first set of feed compositions via solid mixing to form a first print composition, a process 106 of depositing the first print composition to form a first segment of a three-dimensional object, a process 108 of conveying a second set of feed compositions into the mixing chamber according to a second formula, a process 110 of mixing the second set of feed compositions via solid mixing to form a first print composition, and a process 112 of depositing the second print composition to form a second segment of the three-dimensional object. Although the above has been shown using a selected group of processes for the method, there can be many alternatives, modifications, and variations. For example, some of the processes may be expanded and/or combined. Other processes may be inserted to those noted above. Some processes may be removed or replaced. Depending upon the embodiment, the sequence of processes may be interchanged.

The process 102 of conveying a first set of feed compositions into a mixing chamber according to a first formula may include continuously conveying the first set of feed compositions into the mixing chamber, such as via a first cavity pump. Alternatively, a cavity pump may be a positive displacement pump, a syringe pump, a piston pump. The first set of feed compositions may be selected from a plurality of feed compositions stored in a plurality of reservoirs connected to the mixing chamber. Each reservoir of the plurality of reservoirs may be in the form of a cartridge, such as a replaceable cartridge, connected to the mixing chamber and housing a feed composition. The cartridges may be loaded on a carousel. Each feed composition of the plurality of feed compositions includes a first prepolymer, a second prepolymer reactive with the first prepolymer, and one or more pigments. The one or more pigments in each feed composition provide same with a different color than the other feed compositions of the plurality of feed compositions. The plurality of feed compositions may exhibit a plurality of respective colors, such as including a first feed composition having a first primary color (e.g., red), a second feed composition having a second primary color (e.g., blue), and a third feed composition having a third primary color (e.g., yellow).

Each pigment of the one or more pigments may be in the form of solid, resin stabilized pigment particles. Each pigment of the one or more pigments may be at least partially coated with a resin comprising an aldehyde resin, an acrylic resin, a ketone resin or a combination thereof. The first prepolymer and the second prepolymer may be reactive in ambient temperature, such as 20° C. to 28° C. Each pigment of the one or more pigments may comprise from 20 to 70 wt. % pigment, based on a total weight of the pigment particles. The first print composition and/or the second print composition may comprise from 0.1 to 20 wt. % of the pigment particles, based on a total weight of the composition of the print composition. Each feed composition of the plurality of feed compositions may include lees than 5 wt. % total solvents, based on total weight of the composition. The first prepolymer may include a polyamine prepolymer and the second prepolymer may include a polyisocyanate prepolymer. The first set of feed compositions may include two or more feed compositions, and/or the second set of feed compositions may include two or more feed compositions.

The process 104 of mixing the first set of feed compositions via solid mixing to form a first print composition may include applying high shear to the first set of feed compositions, such as without the use of grinding medium and/or filtration system. Mixing the first set of feed compositions via solid mixing may be performed at the mixing chamber, such as using a passive mixing structure (e.g., turbulence-creating sidewalls) and/or an active mixing structure (e.g., a propeller) of the mixing chamber.

The process 106 of depositing the first print composition to form a first segment of a three-dimensional object may include depositing, such as extruding, a shape-retaining filament segment of the first print composition to form a region of the three-dimensional object. The first segment may have a first set of properties including a first color, a first hardness, and/or a first translucency.

The process 108 of conveying a second set of feed compositions into the mixing chamber according to a second formula may include continuously conveying the second set of feed compositions into the mixing chamber, such as via a second cavity pump. Alternatively, a cavity pump may be a positive displacement pump, a syringe pump, a piston pump. The second set of feed compositions may be conveyed into the mixing chamber while the first print composition is deposited. The second set of feed compositions may be selected from the plurality of feed compositions. The second set of feed compositions may include one or more feed compositions included in the first set of feed compositions.

The process 110 of mixing the second set of feed compositions via solid mixing to form a second print composition may include applying high shear to the second set of feed compositions, such as without the use of grinding medium and/or filtration system. Mixing the first set of feed compositions via solid mixing may be performed at the mixing chamber, such as using a passive mixing structure (e.g., turbulence-creating sidewalls) and/or an active mixing structure (e.g., a propeller) of the mixing chamber.

The process 112 of depositing the second print composition to form a second segment of the three-dimensional object may include depositing, such as extruding, a shape-retaining filament segment of the second print composition to form a region of the three-dimensional object. The second segment may have a second set of properties including a second color different from the first color, a second hardness different from the first hardness, and/or a second translucency different from the first translucency. The first segment may be adjacent to the second segment, such as laying on its top, supporting from its bottom, or supporting on its side.

The method 100 may further include, for each feed composition of the plurality of feed compositions, mixing the first prepolymer, the second prepolymer, and the one or more pigments via solid mixing. Each feed composition may be prepared prior to being loaded into their corresponding reservoirs (e.g., cartridges) and prior to being connected to the mixing chamber.

The method 100 may further include receiving a first set of property targets including a first target color, a first target hardness, and/or a first target translucency; and determining the first formula such that the first set of properties of the first segment correspond to the first set of property targets. The method 100 may further include receiving a second set of property targets including a second target color, a second target hardness, and/or a second target translucency; and determining the second formula such that the second set of properties of the second segment correspond to the second set of property targets.

Figure 2:
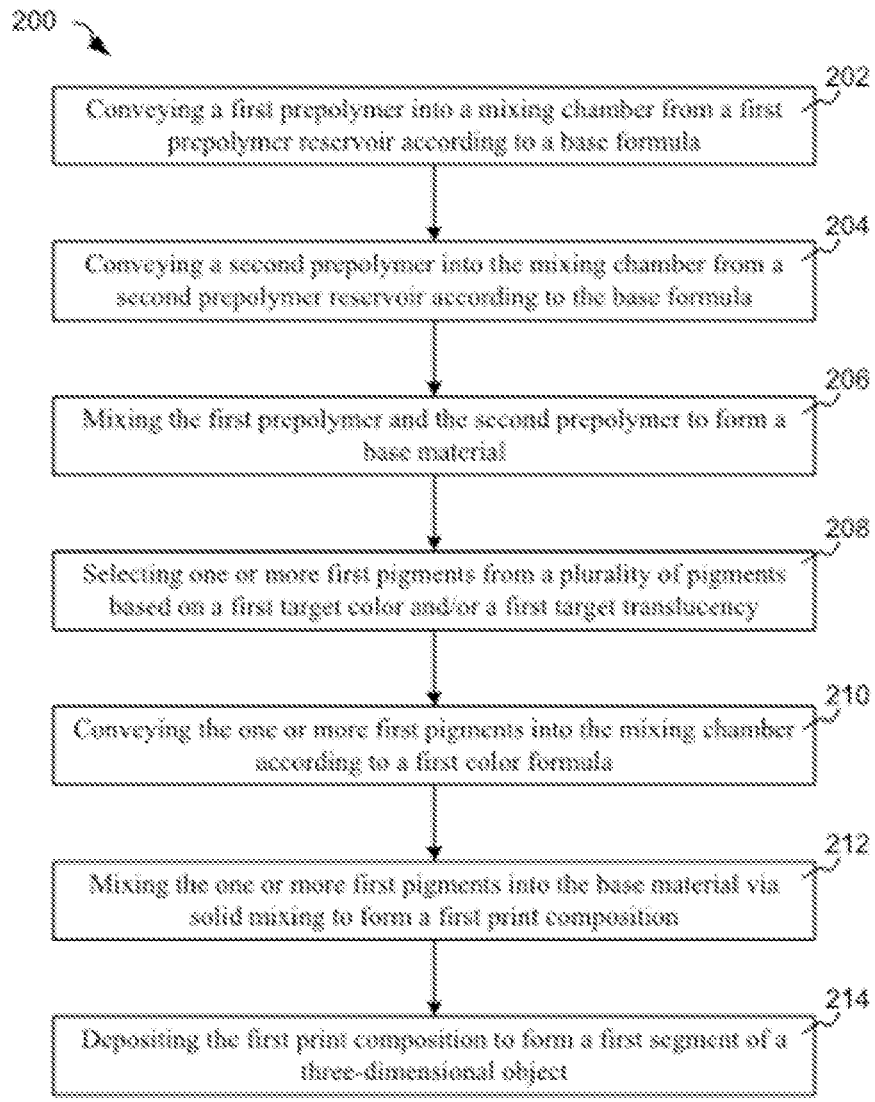
FIG. 2 is diagram showing another method for additive manufacturing a three-dimensional object.

FIG. 2 is a simplified diagram showing a method 200 for additive manufacturing a three-dimensional object, according to some embodiments. The method 200 includes a process 202 of conveying a first prepolymer into a mixing chamber from a first prepolymer reservoir according to a base formula, a process 204 of conveying a second prepolymer into the mixing chamber from a second prepolymer reservoir according to the base formula, a process 206 of mixing the first prepolymer and the second prepolymer to form a base composition, a process 208 of selecting one or more first pigments from a plurality of pigments based on a first target color and/or a first target translucency, a process 210 of conveying the one or more first pigments into the mixing chamber according to a first color formula, a process 212 of mixing the one or more first pigments into the base composition via solid mixing to form a first print composition, and a process 214 of depositing the first print composition to form a first segment of a three-dimensional object. Although the above has been shown using a selected group of processes for the method, there can be many alternatives, modifications, and variations. For example, some of the processes may be expanded and/or combined. Other processes may be inserted to those noted above. Some processes may be removed or replaced. Depending upon the embodiment, the sequence of processes may be interchanged.

The process 202 of conveying a first prepolymer into a mixing chamber from a first prepolymer reservoir according to a base formula may include continuously conveying the first prepolymer into the mixing chamber, such as using a first cavity pump. The second prepolymer may be reactive with the first prepolymer. The method 200 may further include receiving a target hardness and determining the base formula based at least in part upon the target hardness.

The process 204 of conveying a second prepolymer into the mixing chamber from a second prepolymer reservoir according to the base formula may include continuously conveying the second prepolymer into the mixing chamber, such as using a second cavity pump.

The process 206 of mixing the first prepolymer and the second prepolymer to form a base composition may include applying shear, such as high shear, to the first prepolymer and the second prepolymer to form a homogeneous two-phase mixture.

The process 208 of selecting one or more first pigments from a plurality of pigments based on a first target color and/or a first target translucency may include selecting the one or more first pigments such that the first color and/or the first translucency of the first segment correspond to the first target color and/or the first target translucency. The plurality of pigments may be contained in a plurality of pigment reservoirs connected to the mixing chamber. Each pigment reservoir of the plurality of pigment reservoirs may be a cartridge, such as a replaceable cartridge, connected to the mixing chamber and housing a pigment. The cartridges may be loaded on a carousel. Each pigment may have a color different than other pigments of the plurality of pigments. The plurality of pigments may include a first pigment having a first primary color (e.g., red), a second pigment having a second primary color (e.g., blue), and a third pigment having a third primary color (e.g., yellow).

Each pigment of the plurality of pigments may be in the form of solid, resin stabilized pigment particles. Each pigment of the plurality of pigments may be at least partially coated with a resin comprising an aldehyde resin, an acrylic resin, a ketone resin or a combination thereof. The first prepolymer and the second prepolymer may be reactive in ambient temperature, such as 20° C. to 28° C. Each pigment of the plurality of pigments may comprise from 20 to 70 wt. % pigment, based on a total weight of the pigment particles. The first print composition and/or the second print composition may comprise from 0.1 to 20 wt. % of the pigment particles, based on a total weight of the composition of the print composition. The first print composition and/or the second print composition may include lees than 5 wt. % total solvents, based on total weight of the composition. The first prepolymer may include a polyamine prepolymer and the second prepolymer includes a polyisocyanate prepolymer.

The process 210 of conveying the one or more first pigments into the mixing chamber according to a first color formula may include conveying the one or more first pigments from the plurality of pigment reservoirs connected to the mixing chamber. The mixing chamber may be an inline mixing chamber configured to receive the pigments from a plurality of pigment reservoirs connected thereto along the length of the inline mixing chamber.

The process 212 of mixing the one or more first pigments into the base composition via solid mixing to form a first print composition may include applying high shear to the base composition and one or more first pigments, such as without the use of grinding medium and/or filtration system. The mixing may be performed at the mixing chamber, such as using a passive mixing structure (e.g., turbulence-creating sidewalls) and/or an active mixing structure (e.g., a propeller) of the mixing chamber.

The process 214 of depositing the first print composition to form a first segment of a three-dimensional object may include depositing, such as extruding, a shape-retaining filament segment of the first print composition to form a region of the three-dimensional object. The first segment may have a first set of properties including a first color and/or a first translucency.

The method 200 may further include: while depositing the first print composition: selecting one or more second pigments from the plurality of pigments based at least in part on a second target color and/or a second target translucency, conveying the one or more second pigments into the mixing chamber according to a second color formula (e.g., similarly to the conveying of the one or more first pigments), and mixing the one or more second pigments into the base composition via solid mixing to form a second print composition (e.g., similarly to the mixing of the one or more first pigments); and depositing the second print composition to form a second segment of a three-dimensional object (e.g., similarly to the depositing of the depositing of the first composition), the second segment having a second set of properties including a second color different from the first color and/or a second translucency different from the first translucency.

Figure 3:
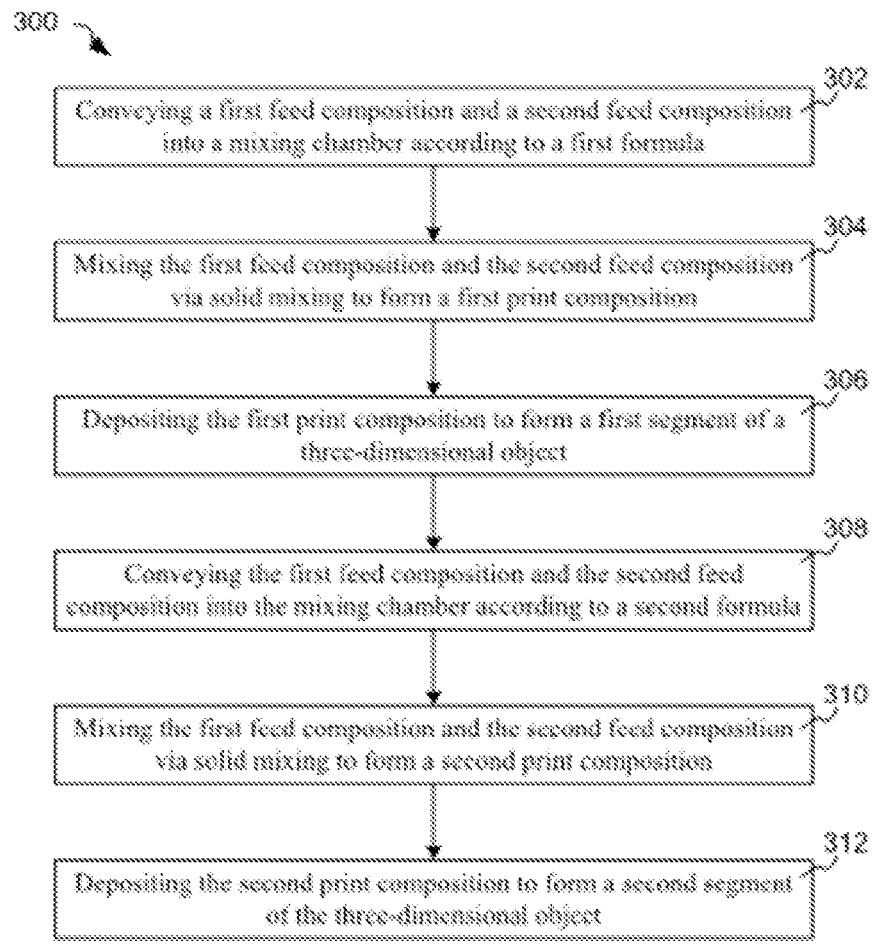
FIG. 3 is diagram showing a further method for additive manufacturing a three-dimensional object.

FIG. 3 is a simplified diagram showing a method 300 for additive manufacturing a three-dimensional object, according to some embodiments. The method 300 includes a process 302 of conveying a first feed composition and a second feed composition into a mixing chamber according to a first formula, a process 304 of mixing the first feed composition and the second feed composition via solid mixing to form a first print composition, a process 306 of depositing the first print composition to form a first segment of a three-dimensional object, a process 308 of conveying the first feed composition and the second feed composition into the mixing chamber according to a second formula, a process 310 of mixing the first feed composition and the second feed composition via solid mixing to form a second print composition, and a process 312 of depositing the second print composition to form a second segment of the three-dimensional object. Although the above has been shown using a selected group of processes for the method, there can be many alternatives, modifications, and variations. For example, some of the processes may be expanded and/or combined. Other processes may be inserted to those noted above. Some processes may be removed or replaced. Depending upon the embodiment, the sequence of processes may be interchanged.

The process 302 of conveying a first feed composition and a second feed composition into a mixing chamber according to a first formula may include continuously conveying the first feed composition and the second feed composition, such as via cavity pumps. The first feed composition may include a first prepolymer and one or more first pigments, and the second feed composition includes a second prepolymer reactive with the first prepolymer. The second feed composition may further include one or more second pigments. The first feed composition may be selected from a plurality of first feed compositions. Each first feed composition of the plurality of first feed compositions may exhibit a color, via the inclusion of one or more pigments, different for other feed compositions of the plurality of feed compositions. Each first feed composition of the plurality of first feed compositions includes the same first prepolymer reactive with the second prepolymer included the second feed composition.

The first prepolymer and the second prepolymer may be reactive in ambient temperature, such as 20° C. to 28° C. The first prepolymer may include a polyamine prepolymer and the second prepolymer may include a polyisocyanate prepolymer. The first prepolymer may include a polyisocyanate prepolymer and the second prepolymer may include a polyamine prepolymer. The pigment particles of the first pigment may be at least partially coated with a resin comprising an aldehyde resin, an acrylic resin, a ketone resin or a combination thereof. The pigment particles may comprise from 20 to 70 wt. % pigment, based on a total weight of the pigment particles. At least one of the first print composition and the second print composition may comprise from 0.1 to 20 wt. % of the pigment particles, based on a total weight of the composition of the print composition. The first feed composition and/or second feed composition may include lees than 5 wt. % total solvents, based on total weight of the composition.

The process 304 of mixing the first feed composition and the second feed composition via solid mixing to form a first print composition may include applying high shear to the first feed composition and the second feed composition, such as without the use of grinding medium and/or filtration system. Mixing the first feed composition and the second feed composition via solid mixing may be performed at the mixing chamber, such as using a passive mixing structure (e.g., turbulence-creating sidewalls) and/or an active mixing structure (e.g., a propeller) of the mixing chamber.

The process 306 of depositing the first print composition to form a first segment of a three-dimensional object may include depositing, such as extruding, a shape-retaining filament segment of the first print composition to form a region of the three-dimensional object. The first segment may have a first set of properties including a first color, a first hardness, and/or a first translucency.

The process 308 of conveying the first feed composition and the second feed composition into the mixing chamber according to a second formula may include continuously conveying the first feed composition and the second feed composition, such as via cavity pumps. The first feed composition and the second feed composition may be conveyed into the mixing chamber according to the second formula while the first print composition is deposited.

The process 310 of mixing the first feed composition and the second feed composition via solid mixing to form a second print composition may include applying high shear to the first feed composition and the second feed composition, such as without the use of grinding medium and/or filtration system. Mixing the first feed composition and the second feed composition via solid mixing may be performed at the mixing chamber, such as using a passive mixing structure (e.g., turbulence-creating sidewalls) and/or an active mixing structure (e.g., a propeller) of the mixing chamber.

The process 312 of depositing the second print composition to form a second segment of the three-dimensional object may include depositing, such as extruding, a shape-retaining filament segment of the second print composition to form a region of the three-dimensional object. The second segment may have a second set of properties including a second color different from the first color, a second hardness different from the first hardness, and/or a second translucency different from the first translucency. The first segment may be adjacent to the second segment.

The method 300 may further include dispersing the one or more first pigments directly into the first prepolymer via solid mixing; and/or dispersing the one or more second pigments directly into the second prepolymer via solid mixing.

The method 300 may further include conveying a third feed composition including one or more third pigments into the mixing chamber according to the first formula such that the first print composition includes the one or more third pigments; and/or conveying the third feed composition including the one or more third pigments into the mixing chamber according to the second formula such that the second print composition includes the one or more third pigments.

The method 300 may further include receiving a first set of property targets including a first target color, a first target hardness, and/or a first target translucency; receiving a second set of property targets including a second target color, a second target hardness, and/or a second target translucency; determining the first formula such that the first set of properties of the first segment correspond to the first set of property targets; and determining the second formula such that the second set of properties of the second segment correspond to the second set of property targets.

The present disclosure provides compositions suitable for use in three-dimensional printing. The composition may comprise at least two co-reactive components, at least one solid-state pigment, and optional other additives, such as rheology modifiers, flow control agents, plasticizers, thermal stabilizers, UV stabilizers, wetting agents, dispersing auxiliaries, deformers, fillers, reactive diluents, flame retardants, catalysts, pigments, solvents, adhesion promoters, and combinations thereof.

The at least two co-reactive components may be mixed together and subsequently deposited as a mixture of co-reactive components that react to form portions of a printed object. For example, two co-reactive components may be mixed together and deposited as a mixture of co-reactive components that react to form a thermoset by delivery of at least two separate streams of the co-reactive components into a mixer such as a static mixer and/or a dynamic mixer to produce a single stream that is then deposited. The co-reactive components may be at least partially reacted by the time a co-reactive composition comprising the reaction mixture is deposited. The deposited reaction mixture may react at least in part after deposition and may also react with previously deposited portions and/or subsequently deposited portions of the object, such as underlying layers or overlying layers of the object.

For example, the two or more co-reactive components can be deposited by dispensing materials through a disposable nozzle attached to a progressive cavity two-component dosing system such as a ViscoTec eco-DUO 450 precision dosing system, wherein the co-reactive components are mixed in-line. A two-component dosing system can comprise, for example, two progressive cavity pumps that separately dose reactants into a disposable static mixer dispenser or into a dynamic mixer. Other suitable pumps include positive displacement pumps, syringe pumps, piston pumps, and progressive cavity pumps. Upon dispensing, the co-reactive materials form an extrudate to provide an initial layer of co-reactive material and successive layers on a base.

A deposition system can include an in-line static and/or dynamic mixer, as well as separate pressurized pumping compartments to hold the at least two co-reactive components and feed the co-reactive materials into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

The solid-state dispersion pigment may be added to one co-reactive component. Alternatively, different solid-state dispersion pigments may be added to each of the co-reactive components. It may be desirable to add one solid-state dispersion pigment to one co-reactive component while printing one or more parts of the object, then adding a different solid-state dispersion pigment to another co-reactive component while printing a separate part of the object to produce differing color regions within the same composite object. Likewise, solid-state pigments may be selected and/or blended to achieve desired tints and colors in the object. This may be accomplished by using a neutral-colored solid-state dispersion pigment mixed with one co-reactive component, while varying the color of a different solid-state dispersion pigment mixed with another co-reactive component.

EXAMPLES

Embodiments provided by the present disclosure are further illustrated by reference to the following examples, which describe methods of making multilayer systems and properties of the multilayer systems. It will be apparent to those skilled in the art that many modifications, both to materials, and methods, may be practiced without departing from the scope of the disclosure.

Example 1

Additive Manufacturing Composition Including a Resin-Stabilized Solid-State Pigment A formulation for three-dimensional printing was prepared. The formulation is suitable for printing by reactive extrusion via Viscotec 2K extruders. Each component was prepared and placed in a separate reservoir (the amine side and the isocyanate side).

The amine component ("amine side") was prepared from the components shown below in Table 3, wherein Desmophen NH 1220, an amine-functional resin, is available from Covestro, Cabosil TS-720, a fumed silica filler, is available from Cabot Corporation, and Inxel IXS-200001 is an orange, solid-state dispersed (SSD) colorant with the composition shown in Table 4, wherein Laropal A81 is an aldehyde resin available from BASF.

TABLE 3

| Amine side composition | |
| --- | --- |
| Component | Weight % |
| Desmophen NH 1220 | 94.5 |
| Cabosil TS-720 | 5 |
| Inxel IXS-200001 Orange SSD colorant | 0.5 |

TABLE 4

| Pigment composition | |
| --- | --- |
| Component | Weight % |
| Laropal A81 | 42-48 |
| Irgazin Orange L2999HD | 50 |
| Dispersant | 2-8 |

Cabosil TS-720 and Desmophen NH 1220 are weighed into a Max 300 L DAC cup and are dispersed via typical Flacktek Speedmixer procedure at 2000 rpm for two minutes. Then the Inxel SSD orange colorant is weighed and added to the Desmophen NH 1220 and Cabosil TS-720 and dispersed again via a typical Speedmixer procedure at 2000 rpm for two minutes in that order. Two ceramic grindstones may be added to facilitate mixing, however, are not necessary.

The isocyanate component ("isocyanate side") was prepared from the components shown below in Table 5, wherein Desmodur N3900 is an aliphatic polyisocyanate resin based on hexamethylene diisocyanate (HDI), available from Covestro, and Cabosil TS-720 is described above.

TABLE 5

| Isocyanate side composition | |
| --- | --- |
| Component | Parts by weight (g) |
| Desmodur N3900 | 95 |
| Cabosil TS-720 | 5 |

The Desmodur N3900 and Cabosil TS-720 are weighed into a Max 300 L DAC cup and dispersed via Speedmixer at 2000 rpm for two minutes.

Formulations can be transferred from DAC cup to Optimum cartridge via Flacktek SpeedDisc for use in three-dimensional printing.

Example 2

Additive Manufacturing Composition Including a Resin-Stabilized Pigment Paste

A formulation for three-dimensional printing was prepared using a pigment paste. The formulation is suitable for printing by reactive extrusion via Viscotec 2K extruders. Each component was prepared and placed in a separate reservoir (the amine side and the isocyanate side).

The amine component ("amine side") was prepared from the components shown below in Table 6, wherein Desmphen NH 1420 is an aspartic ester diamine commercially available from Covestro LLC, Cabosil TS-720 is a fumed silica filler available from Cabot Corporation, and Stan-Tone Red Paste, product code 23ET04, Quinacridone BS, is a polyester urethane paste colorant commercially available from Poly-One.

TABLE 6

Amine side composition

| Component | Parts by weight, g |
|---|---|
| Desmophen NH 1420 | 90.6 |
| Cabosil TS-720 | 8.4 |
| Stan-Tone Red Paste | 1.0 |

The components (Cabosil TS-720, Desmophen NH 1420, and Stan-Tone Red Paste were weighed into a Max 300 L DAC cup and were dispersed via typical Flacktek Speedmixer procedure at 2000 rpm for two minutes.

The isocyanate component ("isocyanate side") was prepared from the components shown below in Table 7, wherein Desmodur N3900 is an aliphatic polyisocyanate resin based on hexamethylene diisocyanate (HDI), available from Covestro, Cabosil TS-720 is described above, and Stan-Tone White Paste is a vinyl paste colorant, product code HCC-33462, commercially available from PolyOne.

TABLE 7

Isocyanate side composition

| Component | Parts by weight, g |
|---|---|
| Desmodur N3900 | 94 |
| Cabosil TS-720 | 5 |
| Stan-Tone White Paste | 1 |

The components (Desmodur N3900, Stan-Tone White Tint, and Cabosil TS-720) were weighed into a Max 300 L DAC cup and dispersed via Speedmixer at 2000 rpm for two minutes.

Both formulations were transferred from the DAC cup to an Optimum cartridge via Flacktek SpeedDisc, and were suitable for three-dimensional printing by reactive extrusion using Viscotec 2K extruders and fused deposition modeling (FDM) methods.

Example 3

Mechanical Properties of Printed Items from Example 2

Dog bones for tensile testing were printed from the formulation described in Example 2. Dog Bone D was tested following procedures documented in ASTM D412.4893. Hardness was measured using a model 2000 max-hand durometer type D, commercially available from Rex Gauge Co. A summary of relevant data is listed below in Table 8.

TABLE 8

Mechanical properties of sample

| Formulation | Max Tensile Strain | Tensile Strength (MPa) | Shore D Hardness |
|---|---|---|---|
| 2K 3D Printable polyurea | 27 | 31 | 66.6 |

Example 4

Additive Manufacturing Composition Including a Resin-Stabilized Dispersion

A co-reactive composition utilizing carbon-carbon bond formation through Michael addition was prepared. The composition is suitable for three-dimensional printing. Each component was prepared and placed in a separate reservoir (the acetoacetate side and the acrylate side).

The acetoacetate component ("acetoacetate side") was prepared from the components shown below in Table 9, wherein BPAMA is a proprietary multifunctional acetoacetate (>3 acetoacetate groups per molecule) crosslinker containing a Bisphenol A backbone and an acetoacetate equivalent weight of 176 g/mol, supplied by PPG Industries, Cabosil TS-720 is a fumed silica filler available from Cabot Corporation, and the catalyst blend is a proprietary catalyst blend for carbon-carbon Michael additions, supplied by PPG Industries.

TABLE 9

Acetoacetate side composition

| Component | Weight % |
|---|---|
| BPAMA | 88.1 |
| Cabosil TS-720 | 2.9 |
| Catalyst Blend | 9.0 |

The components shown in Table 9 were added to a Max 300 L DAC cup and dispersed via Speedmixer. Formulations were transferred from DAC cup to Optimum cartridge via Flacktek SpeedDisc, which was connected to one inlet of a Viscotec 2k extruder mounted to Lulzbot Taz 6 3D printer gantry.

The acrylate component ("acrylate side") was prepared from the components shown below in Table 10, wherein Miramer M340, pentaerythritol triacrylate, commercially available from Miwon, Cabosil TS-720 is a fumed silica filler available from Cabot Corporation, urethane triacrylate is a proprietary aliphatic urethan triacrylate with an acrylate equivalent weight of 270 g/mol, supplied by PPG Industries, and Andaro®PB60 is a high chroma organic pigment dispersion supplied by PPG Industries. The pigment was provided as a 40.38% solids solution in ester-based solvents.

TABLE 10

Acrylate side composition

| Component | Parts by weight, g |
|---|---|
| Miramer M349 | 45.8 |
| Cabosil TS-720 | 4.0 |
| Urethane Triacrylate | 45.2 |
| Andaro ® PB60 | 0.5 |

The components in Table 10 were added to a Max 300 L DAC cup and dispersed via Speedmixer. Formulations were transferred from DAC cup to Optimum cartridge via Flacktek SpeedDisc, which was connected to the other inlet of the Viscotec 2k extruder mounted on the Lulzbot Taz 6 3D printer gantry.

Example 5

Tensile Properties of Printed Item of Example 4

Figure 4:
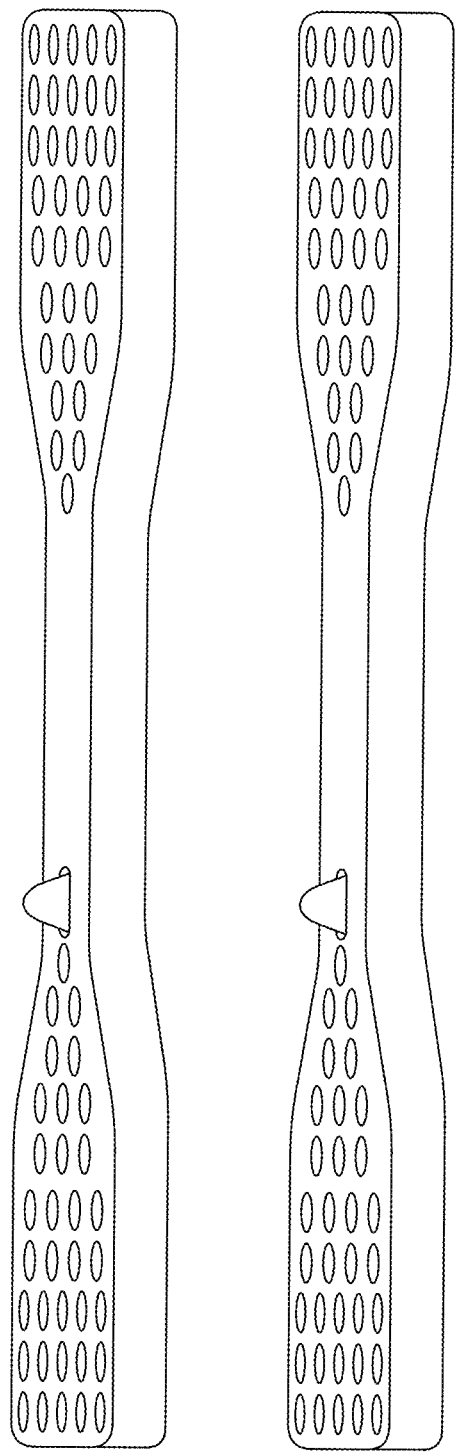
FIG. 4 is an image of a blue-colored 3D printed dog bone as described in Example 4.

The formulations in Tables 9 and 10 were extruded with an acetoacetate to acrylate volume mix ratio of 1:1 and 3D printed into several objects including ASTM D638 Type IV dog bones for tensile tests. An image of the dog bones is shown in FIG. 4.

The densities of the acrylate and acetoacetate blends were approximately identical. The total weight of solvent introduced to the parts by the Andaro® PB60 pigment is approximately 0.14%.

The tensile properties of the 3D printed formulation were tested according to ASTM D638, and are summarized below in Table 11.

TABLE 11

Tensile properties of sample

| Property | Result |
|---|---|
| Young's modulus (MPa) | 250 |
| Ultimate tensile strength (MPA) | 45.5 |
| % Elongation at break | 15.0 |

Example 6

Multi-Feed Printing

A printing system is used in this Example that includes one reservoir containing a reactive species such as an amine resin, a second reservoir containing a second reactive species such as another amine resin, and a third reservoir containing a first pigmenting agent such as a tint, and a fourth reservoir containing a second pigmenting agent. A fifth and sixth reservoir contais a purging material and a rheology modifying material. Each reservoir is connected to an individual dispensing pump, and each reservoir contains a valve. Each valve and dispensing pump are connected to a computer that can control the volume dispensed into either an inline mixing chamber, that may be dynamic or static, as well as to the extruder itself, which then results in printing. This computer makes a series of calculations based on the loaded materials to achieve a desired color. The computer can use a prepared materials database to dispense the proper volume of materials to achieve a color and/or material property.

For example, a user chooses to print a green object. The user selects a desired shade of green on the printer/computer user interface. In doing so the computer, which communicates to each pump and valve of each reservoir, performs a series of calculations based on the materials loaded into the printer to achieve the desired shade of green, and sends an appropriate signal to activate the proper combinations of valves and pumps to each reservoir.

In this example, the first reservoir contains a first amine resin such Desmophen NH 1220, the second reservoir contains a second amine resin, Desmophen NH 1420, the third reservoir contains a blue pigment, Stan-Tone Blue 40ET05, the fourth reservoir contains an isocyanate resin, Desmodur N3900, and a fifth reservoir contains a yellow pigment, Stan-Tone Yellow 12ET03.

Based on the user's desired shade of green, the computer opens the first valve and pumps the first amine resin into the first in-line mixing chamber. Simultaneously, the computer signals the second reservoir to open its valve and begins pumping the second amine resin—which mixes within the first inline mixing chamber. The computer signals to the third reservoir to open its valve and begins pumping the Stan-Tone Blue pigment. The mixture of the two amine resins and the Stan-Tone Blue pigment mixes in a second inline mixing chamber. The combination of the two amine resins and the Stan-Tone Blue pigment is a shade of blue based on the computer's calculations.

Simultaneously, the computer signals to the fourth and fifth reservoir to open its valves and being pumping the Desmodur N 3900 and Stan-Tone Yellow pigment, which would then mix in a third inline mixing chamber. The isocyanate resin is now yellow based on the computer's calculations.

The computer continues to send the appropriate signal to the pumps and valves of the appropriate reservoirs to mix the blue amine resin mixture with the yellow isocyanate mixture. These two mixtures mix in a fourth mixing chamber and deposited by the extruder. This final mixture is the calculated shade of green the user desired. The printer begins printing the user's desired object, and this mixture begins to react and solidify.

A fifth reservoir is incorporated that contains an optically clear, non-reactive material that is pumped through all tubes and mixing chambers to purge the system of colored reactive material for both reactive species lines and mixing chambers.

A sixth reservoir contains a filler agent to add a desired viscosity in order to improve the buildability of the final extruded, colored composition. In this example, the filler material is fumed silica material (specifically, Cabosil TS-720), commercially available from Cabot Corporation. The material may be added to the composition before or after resin pigmentation.

The final produced amine composition would include the following components, set forth below in Table 12:

TABLE 12

| Amine Side: | |
|---|---|
| Component | Part by Weight (g) |
| Desmophen NH 1220 | 90.5 |
| Desmophen NH 1420 | 4 |
| Stan-Tone Blue 40ET05 | 0.5 |
| Cabosil TS-720 | 5 |

The final produced isocyanate composition would include the following components, set forth below in Table 13:

TABLE 13

| Isocyanate Side: | |
|---|---|
| Component | Part by Weight (g) |
| Desmodur N3900 | 94.5 |
| Stan-Tone Yellow 12ET03 | 0.5 |
| Cabosil TS-720 | 5 |

The components are then be mixed prior to extrusion at a 1.36 amine to isocyanate volume ratio using a Viscotec 2k extruder.

In addition, the ratio of pigment is changed during printing to produce a print with continuous color change or a print with discreetly colored features through the use of a purging material in-between a change in colored features. Purging is also accomplished using pigment free resin of either reactive species in order to remove residual pigmentation from the mixing chambers and extruder.

Example 7

Additional Co-Reactive Chemistries

A formulation for three-dimensional printing is prepared. The formulation is suitable for printing by reactive extrusion via Viscotec 2K extruders. Each component is prepared and placed in a separate reservoir. The components are selected from the A and B columns in Table 14 below.

TABLE 14

| Functional Group A | Functional Group B |
| --- | --- |
| Carboxylic Acid | Epoxide |
| Activated unsaturated groups such as acrylate, maleic, or fumaric | Primary or Secondary Amine |
| Isocyanate | Hydroxyl |
| Cyclic Carbonate | Primary or Secondary Amine |
| Acetoacetate | Primary or Secondary Amine |
| Epoxide | Primary or Secondary Amine |
| Thiol | Alkenyl |
| Thiol | Vinyl Ether |
| Thiol | Methacrylate |
| Activated unsaturated groups such as acrylate or maleic | Malonate |

Any component from the A group is added to a first reservoir, and a B component from the corresponding row is added to a second reservoir. The components are mixed with any pigment C or combinations of pigment C from Table 15. The pigment may be added to the first reservoir, the second reservoir, or a third reservoir.

TABLE 15

| Pigment C |
| --- |
| Inxel IXS-200001 Orange SSD colorant |
| Stan-Tone Red Paste |
| Stan-Tone White Paste |
| Stan-Tone Blue 40ET05 |
| Stan-Tone Yellow 12ET03 |

The pigment C is present in the overall composition from 0.5 wt. % to 20 wt. %. The pigment is mixed with A, B, or the combination of A and B via typical Speedmixer procedures. Formulations comprising A, B, and C can be mixed and transferred to an Optimum cartridge via Flacktek Speed Disc for use in three-dimensional printing with a Viscotec 2k extruder mounted on the Lulzbot Taz 6 3D printer gantry. The formulations of A, B, and C can be mixed, printed, and cured.

ASPECTS

Aspect 1. A reactive additive manufacturing composition includes a first co-reactive component; a second co-reactive component reactive with the first co-reactive component; and a pigment composition comprising resin-stabilized pigment particles; and the additive manufacturing composition includes less than 5 wt. % total solvents, based on a total weight of the additive manufacturing composition.

Aspect 2. The composition of aspect 1, wherein the pigment particles are stabilized with a resin comprising an aldehyde resin, an acrylic resin, a ketone resin or a combination thereof.

Aspect 3. The composition of aspects 1 or 2, wherein the pigment particles comprise from 10 to 70 wt. % pigment, based on a total solids weight of the pigment particles.

Aspect 4. The composition of any of aspects 1 to 3, wherein the composition comprises from 0.1 to 10 wt. % of the pigment particles, based on a total weight of the additive manufacturing composition.

Aspect 5. The composition of any of aspects 1 to 4, wherein the first co-reactive component includes a polyamine co-reactive component and the second co-reactive component includes a polyisocyanate co-reactive component, or the first co-reactive component comprises Michael donor and the second co-reactive component comprises a Michael acceptor.

Aspect 6. A method for additive manufacturing, comprising: mixing a first pigment composition comprising resin-stabilized pigment particles with a first co-reactive component; mixing the pigment composition and first co-reactive component with a second co-reactive component to form an additive manufacturing composition, the second co-reactive component reactive with the first co-reactive component, the additive manufacturing composition including less than 5 wt. % total solvents, based on a total weight of the composition; and depositing the additive manufacturing composition.

Aspect 7. The method of aspect 6, wherein the pigment particles are stabilized with a resin comprising an aldehyde resin, an acrylic resin, a ketone resin or a combination thereof.

Aspect 8. The method of aspects 6 or 7, wherein the pigment particles comprise from 10 to 70 wt. % pigment, based on a total solids weight of the pigment particles.

Aspect 9. The method of any of aspects 6 to 8, wherein the printable composition comprises from 0.1 to 10 wt. % of the pigment particles, based on a total weight of the additive manufacturing composition.

Aspect 10. The method of any of aspects 6 to 9, wherein the first co-reactive component includes a polyamine co-reactive component and the second co-reactive component includes a polyisocyanate co-reactive component, or the first co-reactive component comprises Michael donor and the second co-reactive component comprises a Michael acceptor.

Aspect 11. A method for additive manufacturing, comprising: conveying a first feed composition and a second feed composition into a mixing chamber according to a first formula, the first feed composition including a first co-reactive component and one or more first pigments, and the second feed composition including a second co-reactive component reactive with the first co-reactive component; mixing the first feed composition and the second feed composition via solid mixing to form a first print composition; depositing the first print composition to form a first segment of a three-dimensional object, the first segment having a first set of properties including a first color, a first hardness, and/or a first translucency; while depositing the first print composition: conveying the first feed composition and the second feed composition into the mixing chamber according to a second formula, and mixing the first feed composition and the second feed composition via solid mixing to form a second print composition; and depositing the second print composition to form a second segment of the three-dimensional object, the second segment having a second set of properties including a second color different from the first color, and/or a second hardness different from the first hardness, and/or a second translucency different from the first translucency.

Aspect 12. The method of aspect 11, wherein the second feed composition further includes one or more second pigments.

Aspect 13. The method of any of aspects 11 to 12, wherein the one or more first pigments comprise solid, resin-stabilized pigment particles.

Aspect 14. The method of any of aspects 11 to 13, further comprising: dispersing the one or more first pigments directly into the first co-reactive component via solid mixing; and/or dispersing the one or more second pigments directly into the second co-reactive component via solid mixing.

Aspect 15. The method of any of aspects 11 to 14, further comprising: conveying a third feed composition including one or more third pigments into the mixing chamber according to the first formula such that the first print composition includes the one or more third pigments; and/or conveying the third feed composition including the one or more third pigments into the mixing chamber according to the second formula such that the second print composition includes the one or more third pigments.

Aspect 16. The method of any of aspects 11 to 15, further comprising: receiving a first set of property targets including a first target color, a first target hardness, and/or a first target translucency; receiving a second set of property targets including a second target color, a second target hardness, and/or a second target translucency; determining the first formula such that the first set of properties of the first segment correspond to the first set of property targets; and determining the second formula such that the second set of properties of the second segment correspond to the second set of property targets.

Aspect 17. The method of any of aspects 11 to 16, wherein: conveying the first feed composition into the mixing chamber includes continuously conveying the first feed composition; and/or conveying the second feed composition into the mixing chamber includes continuously conveying the second feed composition.

Aspect 18. The method of any of aspects 11 to 17, wherein: the conveying the first feed composition into the mixing chamber includes pumping the first feed composition using a first cavity pump; and/or the conveying the second feed composition into the mixing chamber includes pumping the second feed composition using a second cavity pump.

Aspect 19. The method of any of aspects 11 to 18, wherein: the first co-reactive component and the second co-reactive component are reactive in ambient temperature.

Aspect 20. The method of any of aspects 11 to 19, wherein the first co-reactive component includes a polyamine co-reactive component and the second co-reactive component includes a polyisocyanate co-reactive component, or the first co-reactive component comprises Michael donor and the second co-reactive component comprises a Michael acceptor.

Aspect 21. The method of any of aspects 11 to 20, wherein the first segment is adjacent to the second segment.

Aspect 22. The method of any of aspects 11 to 21, wherein the mixing chamber includes one of: a passive mixing structure; and an active mixing structure.

Aspect 23. The method of any of aspects 11 to 22, wherein the pigment particles of the first pigment are stabilized with a resin comprising an aldehyde resin, an acrylic resin, a ketone resin or a combination thereof.

Aspect 24. The method of any of aspects 11 to 23, wherein the pigment particles comprise from 20 to 70 wt. % pigment, based on a total weight of the pigment particles.

Aspect 25. The method of any of aspects 11 to 24, wherein at least one of the first print composition and the second print composition comprises from 0.1 to 20 wt. % of the pigment particles, based on a total weight of the composition of the print composition.

Aspect 26. The method of any of aspects 11 to 25, wherein the first feed composition and/or second feed composition includes lees than 5 wt. % total solvents, based on total weight of the composition.

Aspect 27. A method for additive manufacturing, comprising: conveying a first co-reactive component into a mixing chamber from a first co-reactive component reservoir according to a base formula; conveying a second co-reactive component into the mixing chamber from a second co-reactive component reservoir according to the base formula, the second co-reactive component being reactive with the first co-reactive component; mixing the first co-reactive component and the second co-reactive component to form a base composition; selecting one or more first pigments from a plurality of pigments based on a first target color and/or a first target translucency, the plurality of pigments contained in a plurality of pigment reservoirs connected to the mixing chamber; conveying the one or more first pigments into the mixing chamber according to a first color formula; mixing the one or more first pigments into the base composition via solid mixing to form a first print composition; and depositing the first print composition to form a first segment of a three-dimensional object, the first segment having a first set of properties including a first color and/or a first translucency.

Aspect 28. The method of aspect 27, further comprising: while depositing the first print composition: selecting one or more second pigments from the plurality of pigments based at least in part on a second target color and/or a second target translucency, conveying the one or more second pigments into the mixing chamber according to a second color formula, and mixing the one or more second pigments into the base composition via solid mixing to form a second print composition; and depositing the second print composition to form a second segment of a three-dimensional object, the second segment having a second set of properties including a second color different from the first color and/or a second translucency different from the first translucency.

Aspect 29. The method of any of aspects 27 to 28, further comprising agitating and/or stirring the base composition as it is conveyed towards a printhead.

Aspect 30. The method of any of aspects 27 to 29, wherein each pigment of the plurality of pigments is in the form of solid, resin-stabilized pigment particles.

Aspect 31. The method of any of aspects 27 to 30, further comprising: receiving a target hardness; determining the base formula based at least in part upon the target hardness.

Aspect 32. The method of any of aspects 27 to 31, wherein: conveying the first co-reactive component into the mixing chamber includes continuously conveying the first co-reactive component into the mixing chamber; and/or conveying the second co-reactive component into the mixing chamber includes continuously conveying the second co-reactive component into the mixing chamber.

Aspect 33. The method of any of aspects 27 to 32, wherein: conveying the first co-reactive component into the mixing chamber includes pumping the first co-reactive component using a first cavity pump; and/or the conveying the second co-reactive component into the mixing chamber includes pumping the second co-reactive component using a first cavity pump.

Aspect 34. The method of any of aspects 27 to 33, wherein: the first co-reactive component and the second co-reactive component are reactive in ambient temperature.

Aspect 35. The method of any of aspects 27 to 34, wherein the first co-reactive component includes a polyamine co-reactive component and the second co-reactive component includes a polyisocyanate co-reactive component.

Aspect 36. The method of any of aspects 28 to 35, wherein the first segment is adjacent to the second segment.

Aspect 37. The method of any of aspects 27 to 36, wherein the mixing chamber includes one of: a passive mixing structure; and an active mixing structure.

Aspect 38. The method of any of aspects 27 to 37, wherein each pigment of the plurality of pigments is stabilized with a resin comprising an aldehyde resin, an acrylic resin, a ketone resin or a combination thereof.

Aspect 39. The method of any of aspects 27 to 38, wherein the pigment particles comprise from 20 to 70 wt. % pigment, based on a total weight of the pigment particles.

Aspect 40. The method of any of aspects 27 to 39, wherein the first print composition and/or the second print composition comprises from 0.1 to 20 wt. % of the pigment particles, based on a total weight of the composition of the print composition.

Aspect 41. The method of any of aspects 27 to 40, wherein the first print composition and/or the second print composition includes lees than 5 wt. % total solvents, based on total weight of the composition.

Aspect 42. A method for additive manufacturing, comprising: conveying a first set of feed compositions into a mixing chamber according to a first formula, the first set of feed compositions being selected from a plurality of feed compositions stored in a plurality of reservoirs connected to the mixing chamber, each feed composition of the plurality of feed compositions including a first co-reactive component, a second co-reactive component reactive with the first co-reactive component, and one or more pigments; mixing the first set of feed compositions via solid mixing to form a first print composition; depositing the first print composition to form a first segment of a three-dimensional object, the first segment having a first set of properties including a first color, a first hardness, and/or a first translucency; while depositing the first print composition: conveying a second set of feed compositions into the mixing chamber according to a second formula, the second set of feed compositions being selected from the plurality of feed compositions; mixing the second set of feed compositions via solid mixing to form a second print composition; depositing the second print composition to form a second segment of the three-dimensional object, the second segment having a second set of properties including a second color different from the first color and/or a second hardness different from the first hardness, and/or a second translucency different from the first translucency.

Aspect 43. The method of aspect 42, further comprising sealing the plurality of reservoirs from ambient substances.

Aspect 44. The method of any of aspects 42 to 43, wherein each pigment of the one or more pigments is in the form of solid, resin-stabilized pigment particles.

Aspect 45. The method of any of aspects 42 to 44, further comprising: for each feed composition, mixing the first co-reactive component, the second co-reactive component, and the one or more pigments via solid mixing.

Aspect 46. The method of any of aspects 42 to 45, wherein the first set of feed compositions includes two or more feed compositions; and/or the second set of feed compositions includes two or more feed compositions.

Aspect 47. The method of any of aspects 42 to 46, further comprising: receiving a first set of property targets including a first target color, a first target hardness, and/or a first target translucency; receiving a second set of property targets including a second target color, a second target hardness, and/or a second target translucency; determining the first formula such that the first set of properties of the first segment correspond to the first set of property targets; and determining the second formula such that the second set of properties of the second segment correspond to the second set of property targets.

Aspect 48. The method of any of aspects 42 to 47, wherein: conveying the first feed composition into the mixing chamber includes continuously conveying the first set of feed compositions; and/or conveying the second set of feed compositions into the mixing chamber includes continuously conveying the second feed composition.

Aspect 49. The method of any of aspects 42 to 48, wherein: the conveying a first set of feed compositions into a mixing chamber includes pumping the first set of feed compositions using a first cavity pump.

Aspect 50. The method of any of aspects 42 to 49, wherein: the first co-reactive component and the second co-reactive component are reactive in ambient temperature.

Aspect 51. The method of any of aspects 42 to 50, wherein the first co-reactive component includes a polyamine co-reactive component and the second co-reactive component includes a polyisocyanate co-reactive component.

Aspect 52. The method of any of aspects 42 to 51, wherein the first segment is adjacent to the second segment.

Aspect 53. The method of any of aspects 42 to 52, wherein the mixing chamber includes one of: a passive mixing structure; and an active mixing structure.

Aspect 54. The method of any of aspects 42 to 53, wherein each pigment of the one or more pigments is stabilized with a resin comprising an aldehyde resin, an acrylic resin, a ketone resin or a combination thereof.

Aspect 55. The method of any of aspects 42 to 54, wherein each pigment of the one or more pigments comprise from 20 to 70 wt. % pigment, based on a total weight of the pigment particles.

Aspect 56. The method of any of aspects 42 to 55, wherein the first print composition and/or the second print composition comprises from 0.1 to 20 wt. % of the pigment particles, based on a total weight of the composition of the print composition.

Aspect 57. The method of any of aspects 42 to 56, wherein each feed composition of the plurality of feed compositions includes lees than 5 wt. % total solvents, based on total weight of the composition.

Aspect 58. The composition of any of aspects 1 to 5 or the method of any of aspects 6 to 56, wherein the first co-reactive component comprises a carboxylic acid and the second co-reactive component comprises an epoxide.

Aspect 59. The composition of any of aspects 1 to 5 or the method of any of aspects 6 to 56, wherein the first co-reactive component comprises an activated unsaturated group such as acrylate, maleic, or fumaric and the second co-reactive component comprises a primary or secondary amine.

Aspect 60. The composition of any of aspects 1 to 5 or the method of any of aspects 6 to 56, wherein the first co-reactive component comprises an isocyanate and the second co-reactive component comprises a hydroxyl.

Aspect 61. The composition of any of aspects 1 to 5 or the method of any of aspects 6 to 56, wherein the first co-reactive component comprises a cyclic carbonate, an acetoacetate, or an epoxide, and the second co-reactive component comprises a primary or secondary amine.

Aspect 62. The composition of any of aspects 1 to 5 or the method of any of aspects 6 to 56, wherein the first co-reactive component comprises a thiol and the second co-reactive component comprises an alkenyl, a vinyl ether, or a methacrylate.

Aspect 63. The composition of any of aspects 1 to 5 or the method of any of aspects 6 to 56, wherein the first co-reactive component comprises an activated unsaturated group such as acrylate or maleic, and the second co-reactive component comprises a malonate.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A reactive additive manufacturing composition, comprising:
    a first co-reactive component;
    a second co-reactive component reactive with the first co-reactive component;
    a pigment composition comprising resin-stabilized pigment particles; and
    the additive manufacturing composition including less than 5 wt. % total solvents, based on a total weight of the additive manufacturing composition;
    wherein the pigment particles are at least partially coated and stabilized with a resin comprising an aldehyde resin, an acrylic resin, a ketone resin, or a combination thereof.

2. The composition of claim 1, wherein the pigment particles comprise from 10 to 70 wt. % pigment, based on a total solids weight of the pigment composition.

3. The composition of any of claim 1, wherein the composition comprises from 0.1 to 10 wt. % of the pigment particles, based on a total weight of the additive manufacturing composition.

4. The composition of any of claim 1, wherein the first co-reactive component comprises a polyamine co-reactive component and the second co-reactive component comprises a polyisocyanate co-reactive component, or the first co-reactive component comprises Michael donor and the second co-reactive component comprises a Michael acceptor.

5. A method for additive manufacturing, comprising:
    mixing a pigment composition comprising resin-stabilized pigment particles with a first co-reactive component,
        wherein the resin-stabilized pigment particles are at least partially coated and stabilized with a resin comprising an aldehyde resin, an acrylic resin, a ketone resin, or a combination thereof;
    mixing the pigment composition and first co-reactive component with a second co-reactive component to form an additive manufacturing composition, the second co-reactive component reactive with the first co-reactive component, the additive manufacturing composition including less than 5 wt. % total solvents, based on a total weight of the print additive manufacturing composition; and
    depositing the print composition.

6. The method of claim 5, wherein the pigment particles comprise from 10 to 70 wt. % pigment, based on a total solids weight of the pigment composition.

7. The method of claim 5, wherein the printable composition comprises from 0.1 to 10 wt. % of the pigment particles, based on a total weight of the additive manufacturing composition.

8. The method of claim 5, wherein the first co-reactive component comprises a polyamine co-reactive component and the second co-reactive component comprises a polyisocyanate co-reactive component, or the first co-reactive component comprises Michael donor and the second co-reactive component comprises a Michael acceptor.

9. A method for additive manufacturing, comprising:
    conveying a first feed composition and a second feed composition into a mixing chamber according to a first formula, the first feed composition including a first co-reactive component and one or more first pigments, and the second feed composition including a second co-reactive component reactive with the first co-reactive component;
    wherein the one or more first pigments comprise resin-stabilized pigment particles;
    wherein the resin-stabilized pigment particles of the one or more first pigments are at least partially coated with a resin comprising an aldehyde resin, an acrylic resin, a ketone resin or a combination thereof;
    mixing the first feed composition and the second feed composition via solid mixing to form a first print composition;
    depositing the first print composition to form a first segment of a three-dimensional object, the first segment having a first set of properties including a first color, a first hardness, and/or a first translucency;
    while depositing the first print composition:
        conveying the first feed composition and the second feed composition into the mixing chamber according to a second formula, and
        mixing the first feed composition and the second feed composition via solid mixing to form a second print composition; and
    depositing the second print composition to form a second segment of the three-dimensional object, the second segment having a second set of properties including a second color different from the first color and/or a second hardness different from the first hardness, and/or a second translucency different from the first translucency.

10. The method of claim 9, wherein the second feed composition further comprises one or more second pigments.

11. The method of claim 9, further comprising:
    dispersing the one or more first pigments directly into the first co-reactive component via solid mixing; and/or
    dispersing the one or more second pigments directly into the second co-reactive component via solid mixing.

12. The method of claim 9, further comprising:
    conveying a third feed composition including one or more third pigments into the mixing chamber according to the first formula such that the first print composition comprises the one or more third pigments; and/or conveying the third feed composition including the one or more third pigments into the mixing chamber according to the second formula such that the second print composition comprises the one or more third pigments.

13. The method of claim 9, further comprising:

receiving a first set of property targets including a first target color, a first target hardness, and/or a first target translucency;

receiving a second set of property targets including a second target color, a second target hardness, and/or a second target translucency;

determining the first formula such that the first set of properties of the first segment correspond to the first set of property targets; and determining the second formula such that the second set of properties of the second segment correspond to the second set of property targets.

14. The method of claim 9, wherein:

conveying the first feed composition into the mixing chamber comprises continuously conveying the first feed composition; and/or conveying the second feed composition into the mixing chamber comprises continuously conveying the second feed composition.

15. The method of claim 9, wherein:

the conveying the first feed composition into the mixing chamber comprises pumping the first feed composition using a first cavity pump; and/or the conveying the second feed composition into the mixing chamber comprises pumping the second feed composition using a second cavity pump.

16. The method of claim 9, wherein:

the first co-reactive component and the second co-reactive component are reactive in ambient temperature.

17. The method of claim 9, wherein the first co-reactive component comprises a polyamine co-reactive component and the second co-reactive component comprises a polyisocyanate co-reactive component, or the first co-reactive component comprises Michael donor and the second co-reactive component comprises a Michael acceptor.

18. The method of claim 9, wherein the first segment is adjacent to the second segment.

19. The method of claim 9, wherein the mixing chamber comprises one of:

a passive mixing structure; and an active mixing structure.

20. The method of claim 9, wherein the pigment particles comprise from 20 to 70 wt. % pigment, based on a total weight of the pigment particles.

21. The method of claim 9, wherein at least one of the first print composition and the second print composition comprises from 0.1 to 20 wt. % of the pigment particles, based on a total weight of the composition of the print composition.

* * * * *